US011260292B2

United States Patent
Ho et al.

(10) Patent No.: US 11,260,292 B2
(45) Date of Patent: Mar. 1, 2022

(54) GAMING DEVICE AND GAMING CONTROLLER

(71) Applicants: Ming-Hsuan Ho, Taipei (TW); Chuang-Yuan Cheng, Taipei (TW); Che-An Wu, Taipei (TW); Yu-Chiang Lo, Taipei (TW); Pao-Hsuan Shen, Taipei (TW); Chen-Cheng Wang, Taipei (TW); Chun-Chieh Chen, Taipei (TW); Ming-Hsien Wu, Taipei (TW); Chen-Yi Huang, Taipei (TW)

(72) Inventors: Ming-Hsuan Ho, Taipei (TW); Chuang-Yuan Cheng, Taipei (TW); Che-An Wu, Taipei (TW); Yu-Chiang Lo, Taipei (TW); Pao-Hsuan Shen, Taipei (TW); Chen-Cheng Wang, Taipei (TW); Chun-Chieh Chen, Taipei (TW); Ming-Hsien Wu, Taipei (TW); Chen-Yi Huang, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 108 days.

(21) Appl. No.: 16/796,891

(22) Filed: Feb. 20, 2020

(65) Prior Publication Data
US 2020/0324197 A1    Oct. 15, 2020

Related U.S. Application Data

(60) Provisional application No. 62/831,692, filed on Apr. 9, 2019.

(51) Int. Cl.
*A63F 13/245*    (2014.01)
*A63F 13/92*    (2014.01)
(Continued)

(52) U.S. Cl.
CPC .......... *A63F 13/245* (2014.09); *A63F 13/213* (2014.09); *A63F 13/24* (2014.09);
(Continued)

(58) Field of Classification Search
CPC ...................... A63F 13/245; A63F 2300/1062
See application file for complete search history.

(56) References Cited

U.S. PATENT DOCUMENTS 6,461,238 B1 * 10/2002 Rehkemper ............. A63F 13/08
463/6
2004/0104825 A1 * 6/2004 Wang .................... A63F 13/803
341/22
(Continued)

FOREIGN PATENT DOCUMENTS

CN    203355268    12/2013
CN    203564761    4/2014

OTHER PUBLICATIONS

"Office Action of Taiwan Counterpart Application", dated Jul. 1, 2020, p. 1-p. 7.

*Primary Examiner* — James S. McClellan
*Assistant Examiner* — Peter J Iannuzzi
(74) *Attorney, Agent, or Firm* — JCIPRNET

(57) ABSTRACT

A gaming device includes a self-stabilizing module including a first portion and a second portion, a controller assembly disposed at the second portion, a motion sensor, an operation processing module, and a display screen disposed at the first portion. The operation processing module generates a frame signal to the display screen according to a program. The controller assembly and the second portion rotate about at least one self-stabilizing axis relative to the first portion when the self-stabilizing module is activated. The motion sensor generates a control signal due to the relative rotation of the first and second portions. The operation processing module generates another frame signal cor-
(Continued)

responding to a movement posture of the controller assembly relative to the display screen according to the control signal and the program. The display screen is not located on a movement track of the controller assembly. A gaming controller is also provided.

35 Claims, 22 Drawing Sheets

(51) Int. Cl.
*A63F 13/98* (2014.01)
*A63F 13/803* (2014.01)
*A63F 13/213* (2014.01)
*A63F 13/24* (2014.01)
*A63F 13/26* (2014.01)

(52) U.S. Cl.
CPC ............ *A63F 13/26* (2014.09); *A63F 13/803* (2014.09); *A63F 13/92* (2014.09); *A63F 13/98* (2014.09)

(56) References Cited

U.S. PATENT DOCUMENTS

| | | | |
|---|---|---|---|
| 2006/0038890 A1* | 2/2006 | MacIntosh | A63F 13/02 348/211.99 |
| 2006/0258452 A1* | 11/2006 | Hsu | A63F 13/06 463/36 |
| 2011/0310002 A1* | 12/2011 | Tidemand | A63F 13/235 345/156 |
| 2012/0091313 A1* | 4/2012 | Cohn | H04M 1/04 248/682 |
| 2019/0374852 A1* | 12/2019 | Sakaguchi | A63F 13/213 |
| 2021/0019919 A1* | 1/2021 | Schmuck | G06T 11/00 |

* cited by examiner

GAMING DEVICE AND GAMING CONTROLLER

CROSS-REFERENCE TO RELATED APPLICATION

This application claims the priority benefit of U.S. provisional application Ser. No. 62/831,692, filed on Apr. 9, 2019. The entirety of the above-mentioned patent application is hereby incorporated by reference herein and made a part of this specification.

BACKGROUND OF THE INVENTION

1. Field of the Invention

The invention relates to a gaming device and a gaming controller.

2. Description of Related Art

As the market for video games and mobile devices continues to expand, there are many mobile games for the mobile devices on the market at present. However, a game developed to be used on an existing mobile device still needs to be controlled by using a button or a touch screen disposed on the mobile device. Therefore, it is very inconvenient for users, and user's physical experience of the game is easily degraded due to poor controllability.

In view of the above, how to provide a gaming device or a gaming controller for reflecting a status of a game on an existing mobile device is a problem that needs to be considered and resolved by a person skilled in the art.

SUMMARY OF THE INVENTION

The invention provides a gaming device and a gaming controller that can provide a better game operating feeling for a mobile game.

The gaming device in the invention includes a self-stabilizing module, a controller assembly, a motion sensor, an operation processing module, and a display screen. The self-stabilizing module includes a first portion and a second portion. The controller assembly is assembled to the second portion and can move relative to the second portion. The display screen is assembled to the first portion, and the operation processing module generates a frame signal to the display screen according to a program. The controller assembly and the second portion rotate about a self-stabilizing axis relative to the first portion when the self-stabilizing module is activated. The motion sensor generates a control signal due to the relative rotation of the first portion and the second portion. The operation processing module generates another frame signal to the display screen according to the control signal and the program. The another frame signal correspondingly depicts a movement posture of the controller assembly relative to the display screen. The display screen is not located on a movement track of the controller assembly when the controller assembly rotates about the self-stabilizing axis relative to the first portion.

The gaming controller in the invention is configured to contact an external electronic device to operate a game, and the gaming controller includes a self-stabilizing module, a motion sensor, and a controller assembly. The self-stabilizing module includes a first portion and a second portion, and the external electronic device is adapted to be assembled to the first portion. The controller assembly is disposed at the second portion. The controller assembly and the second portion rotate about at least one self-stabilizing axis relative to the first portion when the self-stabilizing module is activated, and the external electronic device is not located on a movement track of the controller assembly. The motion sensor generates a control signal due to the relative rotation of the first portion and the second portion and transmits the control signal to the external electronic device.

In view of the above, the gaming device or the gaming controller is cooperated with the controller assembly, the motion sensor, and the operation processing module via the self-stabilizing module, so that after the self-stabilizing module is activated, the relative rotational motion generated by the first portion and the second portion can be sensed by the motion sensor to generate the control signal. Further, the operation processing module receives the control signal to generate the frame signal to the display screen, so that the frame signal can reflect a current operation posture of the controller assembly relative to the display screen in real time. Therefore, a user can feel a sense of presence when operating the gaming device via a real-time operation of the controller assembly and a real-time reaction to the display screen.

To make the features and advantages of the invention clear and easy to understand, the following gives a detailed description of embodiments with reference to accompanying drawings.

DESCRIPTION OF THE EMBODIMENTS

Figure 1:
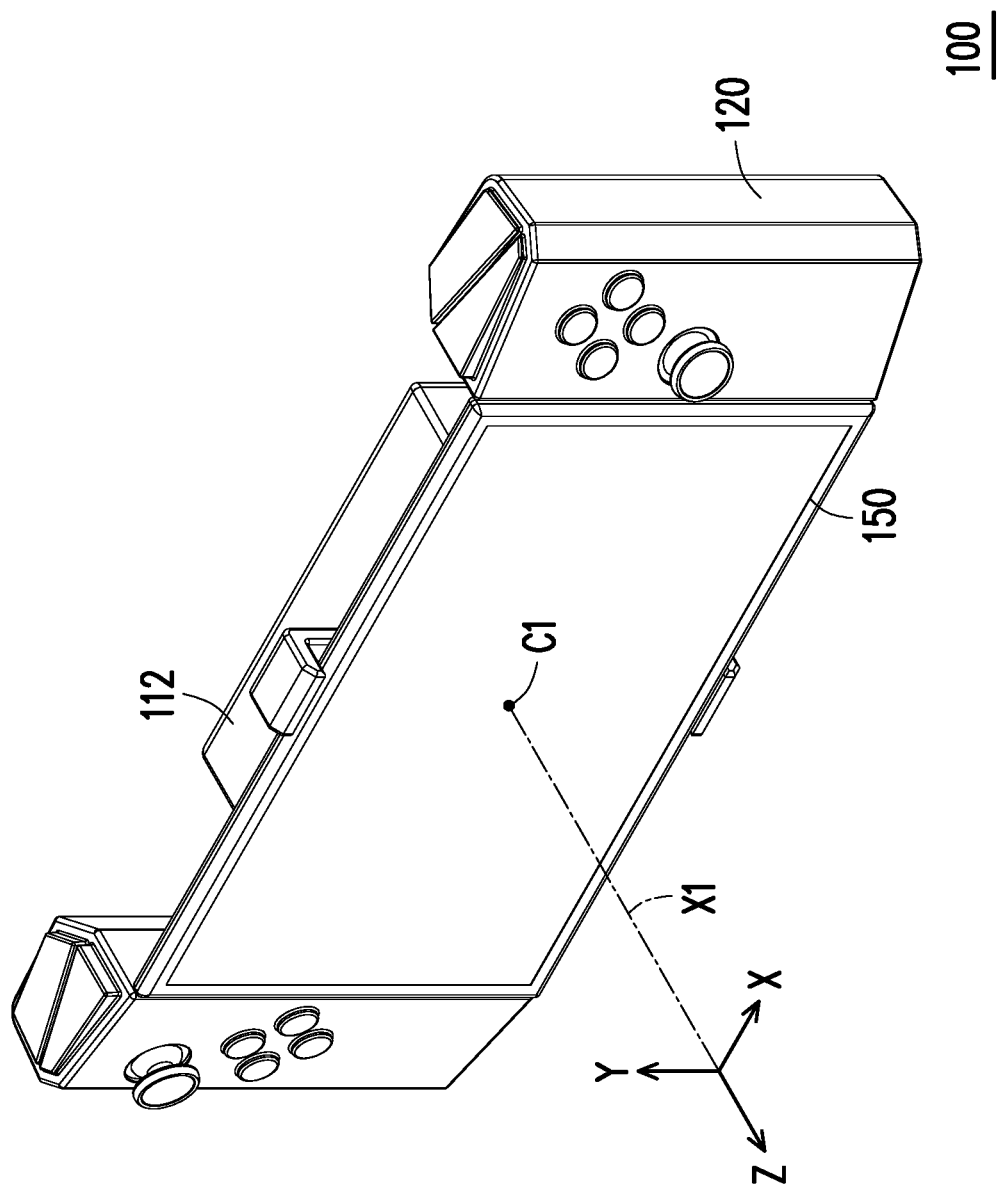
FIG. 1 is a schematic view of a gaming device according to an embodiment of the invention.
Figure 2:
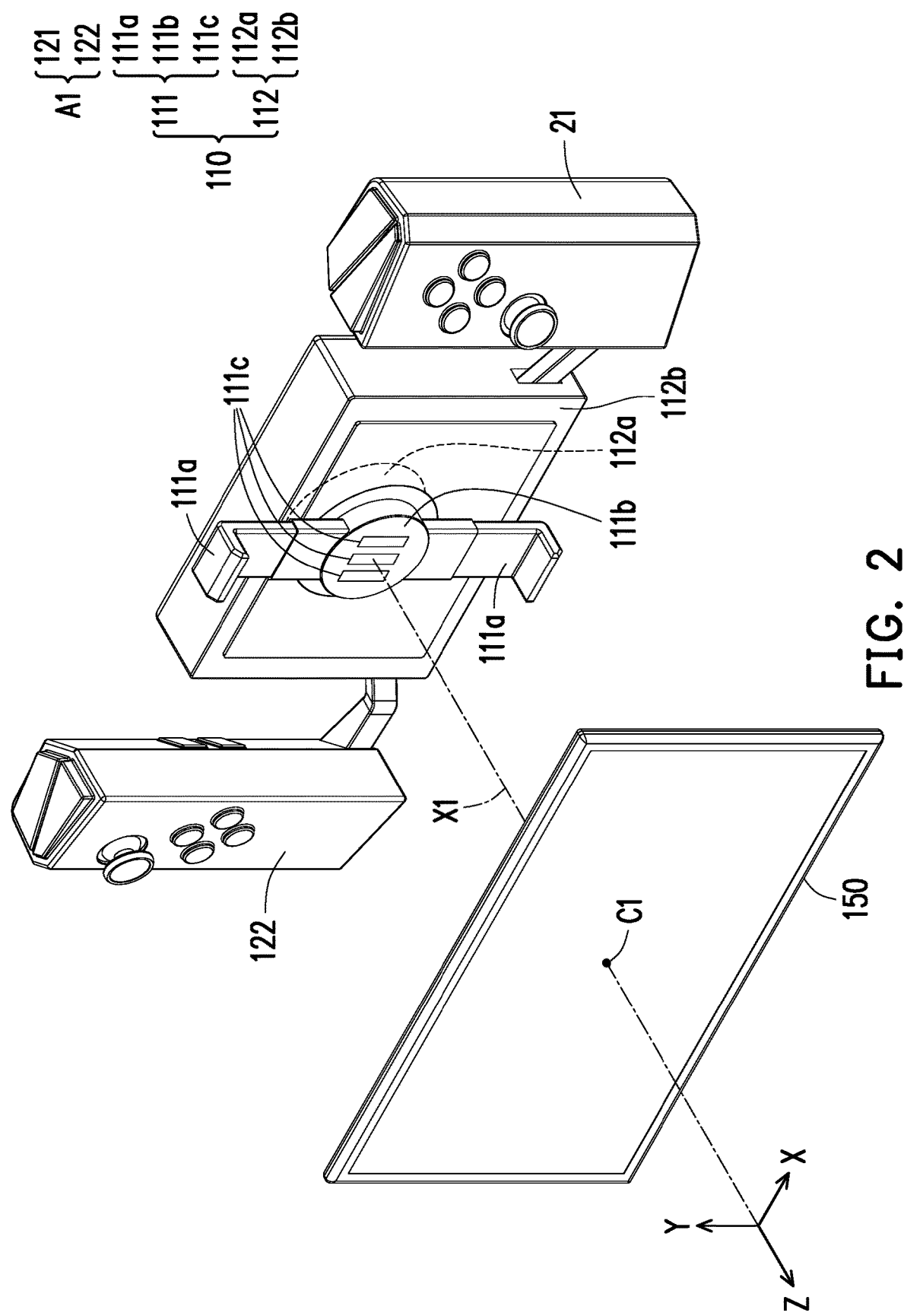
FIG. 2 and FIG. 3A are exploded views of the gaming device in FIG. 1 at different locations.
Figure 3A:
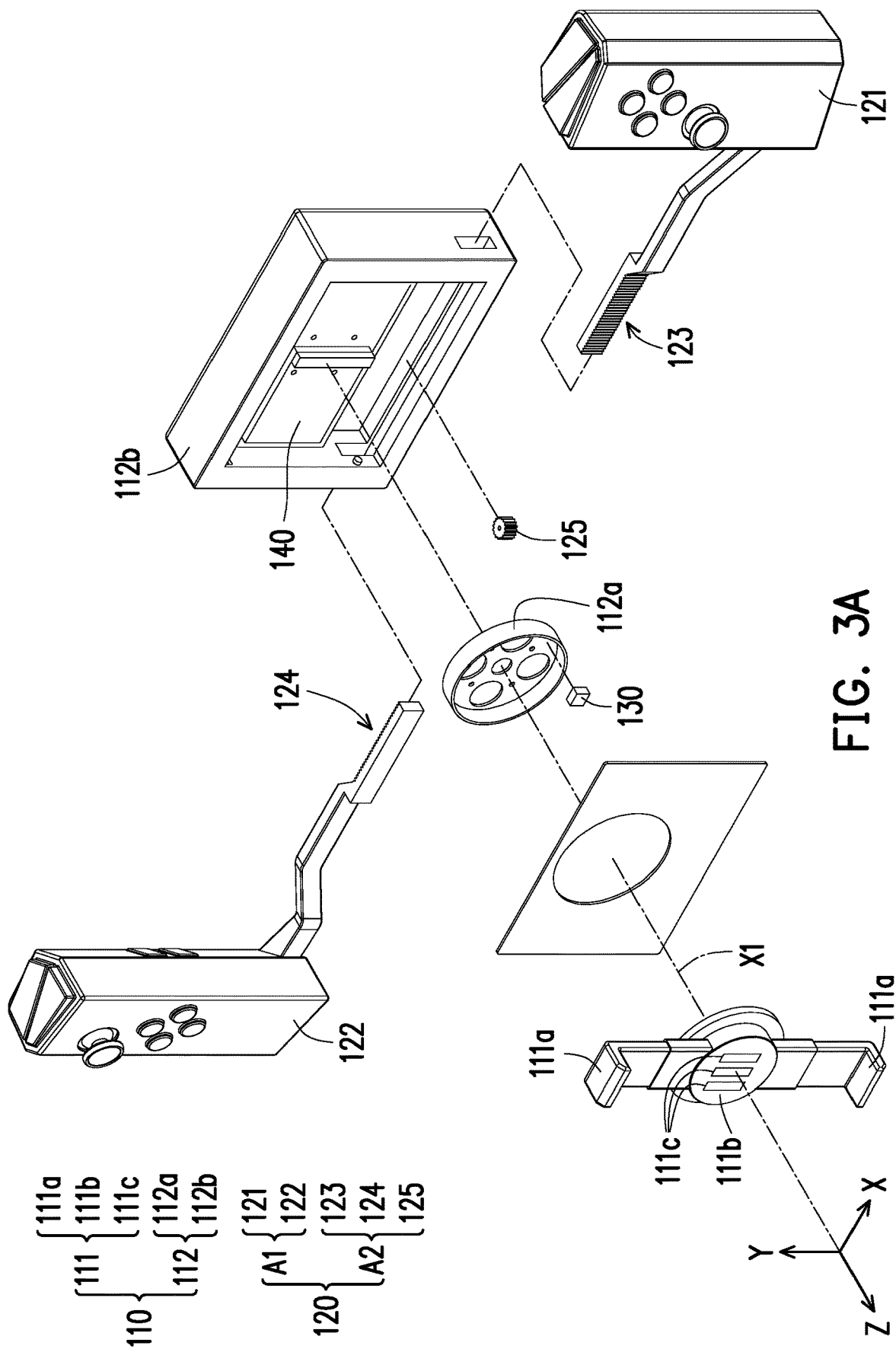

FIG. 1 is a schematic view of a gaming device according to an embodiment of the invention. FIG. 2 and FIG. 3A are exploded views of the gaming device in FIG. 1. Furthermore, rectangular coordinates X-Y-Z are provided in the figure to facilitate description of members. Referring to FIG. 1 to FIG. 3A, in the present embodiment, a gaming device 100 includes a self-stabilizing module 110, a controller assembly 120, a motion sensor 130, an operation processing module 140, and a display screen 150. The self-stabilizing module 110 includes a first portion 111 and a second portion 112, and the first portion 111 and the second portion 112 can rotate about a self-stabilizing axis X1 relative to each other. The display screen 150 is disposed at the first portion 111, and the controller assembly 120 is disposed at the second portion 112. Therefore, the controller assembly 120 and the second portion 112 can rotate about the self-stabilizing axis X1 relative to the first portion 111 and the display screen 150 when the self-stabilizing module 110 is activated, and vice versa. In the embodiment, the self-stabilizing axis X1 is substantially coaxial with a Z-axis of the rectangular coordinates X-Y-Z, and a center C1 of the display screen 150 is located on the Z-axis. In other words, the center C1 is regarded as being located on the self-stabilizing axis X1, that is, a normal line of the display screen 150 is parallel to the self-stabilizing axis X1. In this case, the normal line of the display screen 150 is at an angle with the self-stabilizing axis X1, and the angle is 0 degrees, so that a user can obtain a better view angle when using the gaming device 100.

It should be mentioned that in other non-illustrated embodiments, the center C1 of the display screen 150 can be alternatively disposed in a manner of deviating from the self-stabilizing axis X1. In addition, in other non-illustrated embodiments, the display screen 150 can be alternatively disposed in a manner in which the display screen 150 is not parallel to the self-stabilizing axis X1. Herein, based on the premise that postures of operating the controller assembly 120 and viewing the display screen 150 by the user are in accordance with ergonomics, the angle between the normal line of the display screen 150 and the self-stabilizing axis X1 may range from −90 degrees to +90 degrees.

Figure 4A:
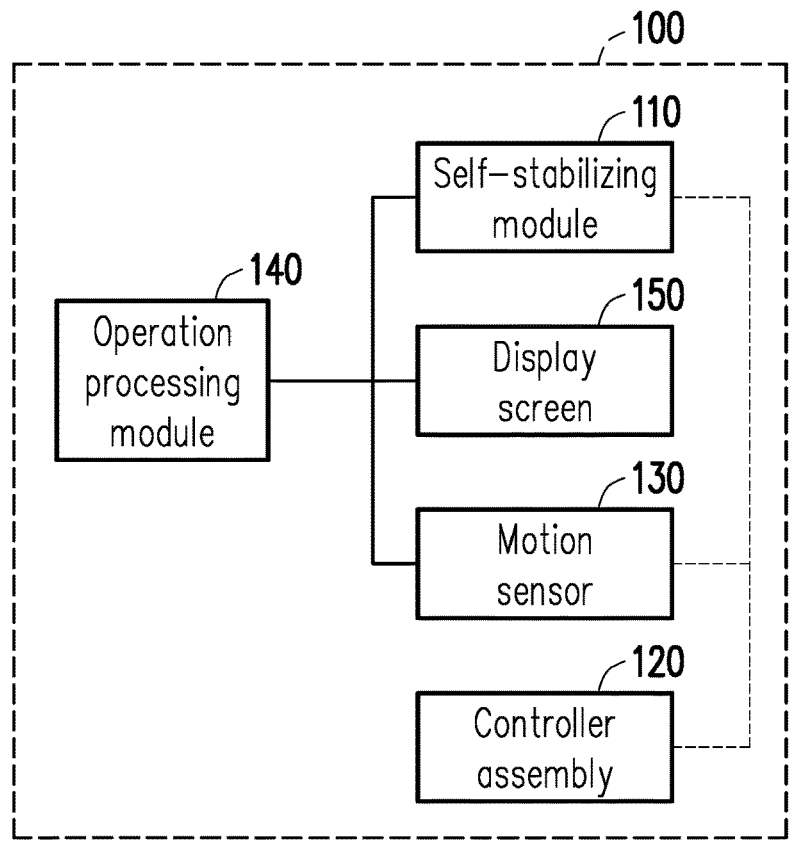
FIG. 4A is a block view of related members of the gaming device in FIG. 1.

Referring to FIG. 3A again, in the present embodiment, the motion sensor 130 is disposed at the second portion 112 to detect a relative rotation angle between the first portion 111 and the second portion 112. Further, the first portion 111 includes a driving body 111b, a clamping portion 111a, and an electrical connection portion 111c (for example, a gold finger), and the second portion 112 includes a driving body 112a and a structural member 112b. The driving body 111b and the driving body 112a are rotatably coupled to each other, and the electrical connecting portion 111c is disposed on the driving body 111b. The clamping portion 111a is telescopically disposed at the clamping portion 111a, the driving body 112a and the operation processing module 140 are disposed in the structural member 112b, and a part of members of the controller assembly 120 are movably disposed in the structural member 112b. In other words, the operation processing module 140 and the self-stabilizing module 110 are disposed in a same structural member. FIG. 4A is a block view of related members of the gaming device in FIG. 1. Solid lines indicate an electrical connection between the members, and dashed lines only describe a braking relationship between the members. First, referring to FIG. 3A and FIG. 4A, in the present embodiment, after the foregoing members are assembled, the operation processing module 140 is electrically connected to the self-stabilizing module 110 and the motion sensor 130. When the display screen 150 is disposed at the first portion 111 and is clamped and fixed by the clamping portion 111a, another electrical connection portion (for example, another gold finger that is not shown) on the back of the display screen 150 can be connected to the electrical connection portion 111c, so that the display screen 150 is electrically connected to the operation processing module 140 disposed in the structural member 112b. However, whether the display the screen 150 and the operation processing module 140 are electrically connected directly or indirectly is not limited herein. That is, according to the prior art, any prior-art means that can be used by the operation processing module 140 to generate a signal contact with the display screen 150 is applicable to the present embodiment. For example, the display screen 150 can establish a telecommunication connection to the operation processing module 140 through wireless communication. In addition, a means for assembling the display screen 150 to the first portion 111 is not limited in the present embodiment. In other embodiments, the display screen 150 may be assembled to the first portion 111 through snapping, magnetic fixing, or the like.

Figure 3B:
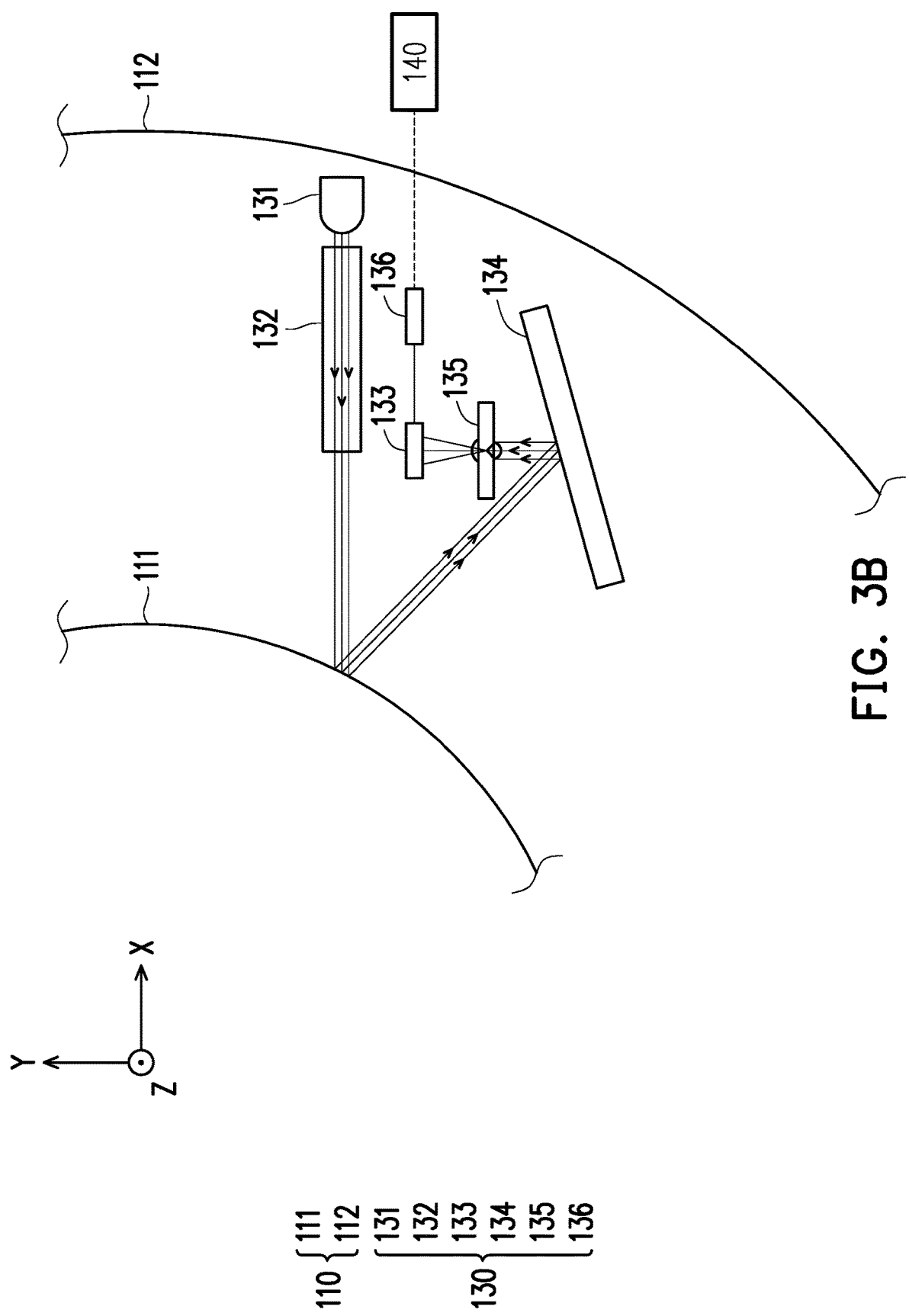
FIG. 3B is a schematic view of a motion sensor of the gaming device in FIG. 3A.

FIG. 3B is a schematic view of a motion sensor of the gaming device in FIG. 3A. Referring to FIG. 3A, FIG. 3B and FIG. 4A, the motion sensor 130 in the present embodiment is an optical tracking sensor including a light emitting element 131, a light guide element 132, a sensing element 133, a reflective element 134, a lens 135, and an image analysis element 136. As described above, the first portion 111 and the second portion 112 rotate about the self-stabilizing axis X1 (that is, the Z-axis of the rectangular coordinates X-Y-Z) relative to each other when the self-stabilizing module 110 is activated. In this case, the light emitting element 131 located at the second portion 112 is also activated, and provides a light beam (shown in FIG. 3B) accordingly, the light beam being projected to the first portion 111 via the light guide element 132. Then, the first portion 111 reflects the light beam to the light reflecting element 134, and the light beam being incident on the sensing element 133 after reflection of the light reflecting element 134 and refraction of the lens 135. The sensing element 133 converts the received light beam into an image signal and transmits the image signal to the image analysis element 136 for processing and analysis. Therefore, during the relative rotation between the first portion 111 and the second portion 112, the image analysis element 136 may determine a direction, an angle, and a speed of the relative rotation between the first portion 111 and the second portion 112, and the image analysis element 136 provides a control signal for the operation processing module 140 accordingly, so that the operation processing module 140 provides a frame signal in accordance with corresponding motion for the display screen 150.

Figure 3C:
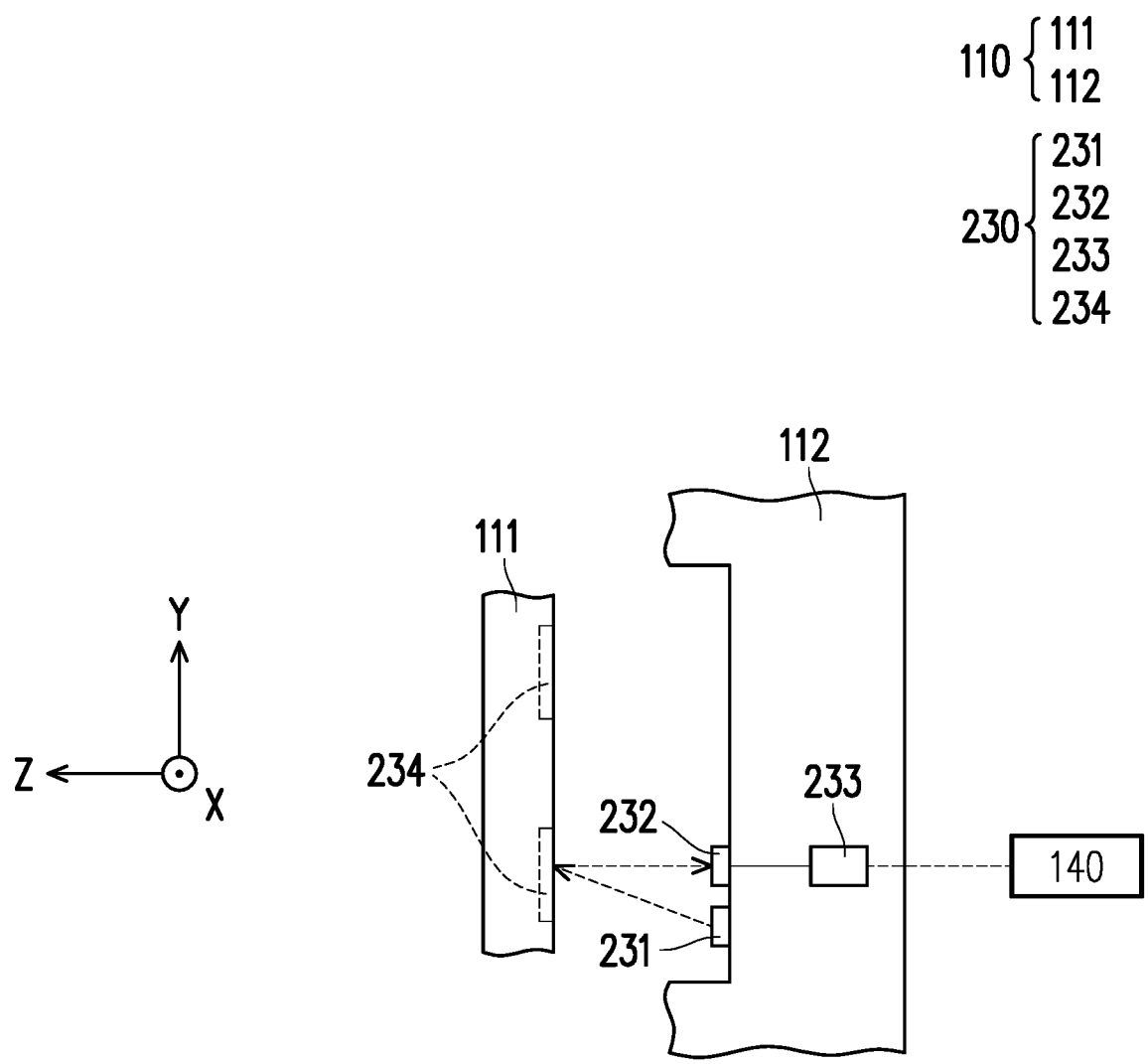
FIG. 3C is a schematic view of a motion sensor according to another embodiment.

FIG. 3C is a schematic view of a motion sensor according to another embodiment. Referring to FIG. 3C, different from the foregoing embodiment, the motion sensor 230 in the present embodiment is an optical tracking sensor including a light emitting element 231, a sensing element 232, and an image analysis element 233 disposed at the second portion 112 and a plurality of light reflective elements 234 disposed at the first portion 111. The reflective elements 234 are arranged at regular intervals around the Z axis at the first portion 111. Therefore, when the first portion 111 rotates about the self-stabilizing axis X1 (that is, the Z-axis), the light reflective elements 234 form a grating-like structure to generate different grating signals according to a rotation direction, angle and speed of the first portion 111 and transmit the different grating signals to the sensing element 232. The sensing component 232 transmits the received grating signals to the image analysis element 233 for processing and analysis to determine the rotation direction, angle and speed of the first portion 111, and provides a control signal for the operation processing module 140 accordingly, so that the operation processing module 140 provides a frame signal in accordance with corresponding motion for the display screen 150.

In addition, in a non-illustrated embodiment, the motion sensor may be alternatively a gyroscope or an acceleration sensing element disposed at the first portion 111 or the second portion 112 to sense a change of motion between the first portion 111 and the second portion 112 and determine specific motion. This can be learned from the prior art, and details are not described herein.

Figure 5A:
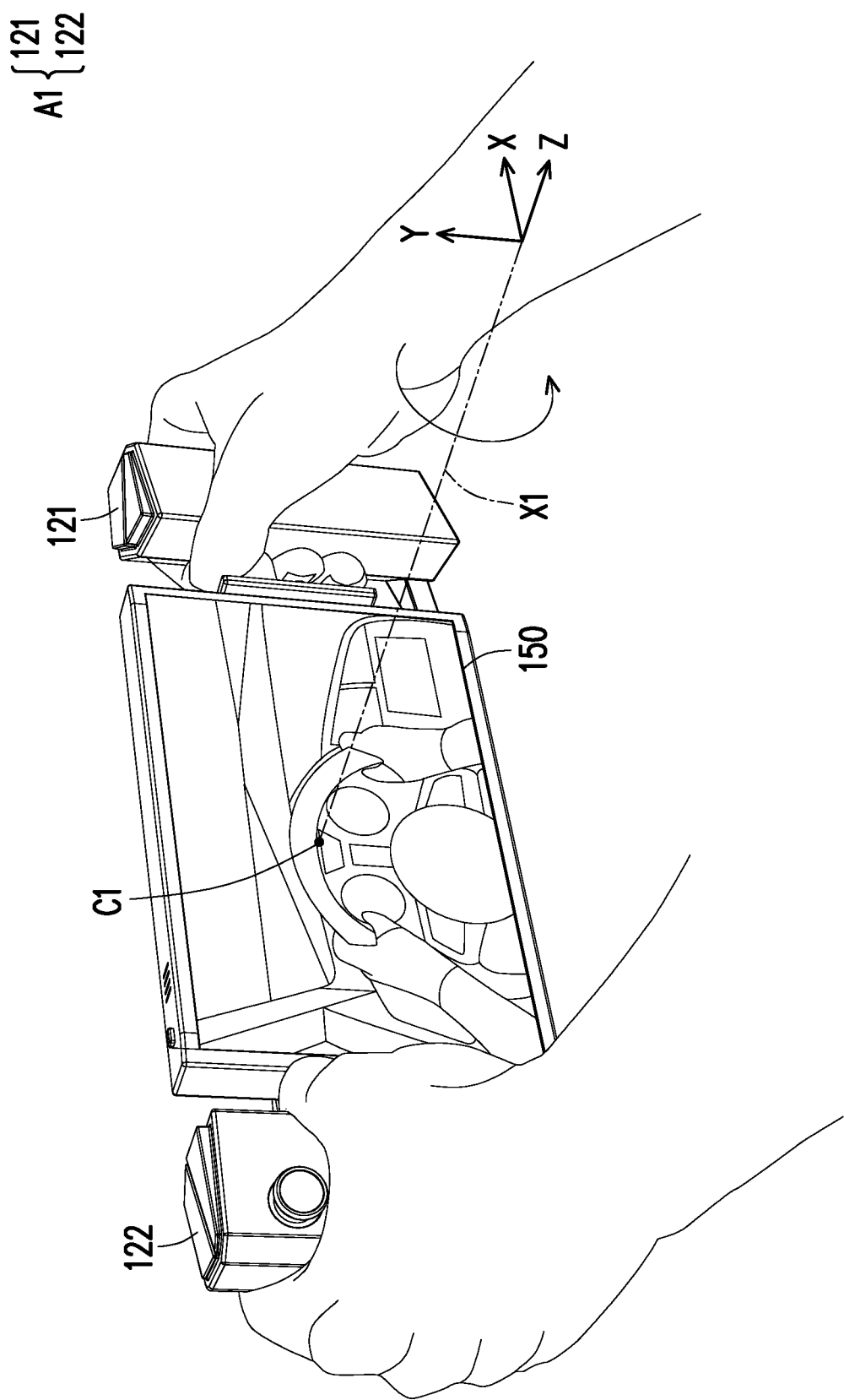
FIG. 5A and FIG. 5B are schematic views of the gaming device in FIG. 1 in different statuses.
Figure 5B:
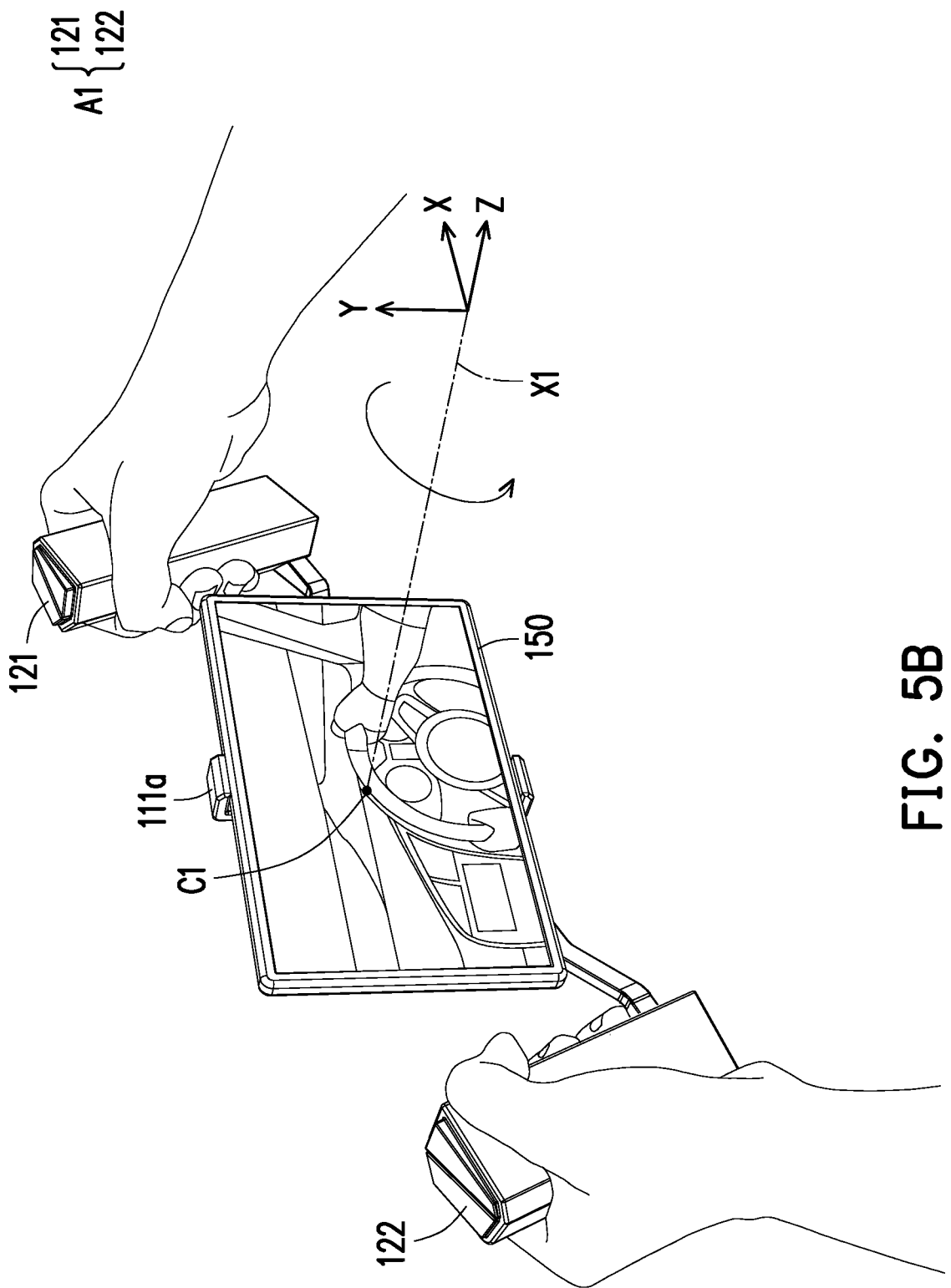

FIG. 5A and FIG. 5B are schematic views of the gaming device in FIG. 1 in different statuses. First, referring to FIG. 5A, based on the foregoing member configuration, when the first portion 111 and the second portion 112 of the self-stabilizing module 110 rotate relative to each other, the motion sensor 130 generates a control signal and transmits the control signal to the operation processing module 140, so that the operation processing module 140 provides a frame signal for the display screen 150, the frame signal corresponding to a movement posture of the controller assembly 120 relative to the display screen 150.

In other words, referring to FIG. 5A and FIG. 5B, the operation processing module 140 of the gaming device 100 in the present embodiment can generate a frame on the display screen 150 according to a program built within the gaming device 100. After the self-stabilizing module 110 is activated, a user can hold a handle structure A1 including a pair of controllers 121 and 122 of the controller assembly 120, to drive the controller assembly 120 and the second portion 112 rotate about the self-stabilizing axis X1 of the self-stabilizing module 110 relative to the first portion 111 and the display screen 150. Accordingly, the motion sensor 130 senses the rotational motion to generate a control signal and transmit the control signal to the operation processing module 140, so that the operation processing module 140 generates a frame signal to the display screen 150 according to the control signal and the program, to cause a current motion status of the controller assembly 120 to be correspondingly displayed on the display screen 150. For example, at a first timing shown in FIG. 5A, the operation processing module 140 forms a frame on the display screen 150 according to the program. In this case, relative rotation between the first portion 111 and the second portion 112 is not performed. Then, at a second timing shown in FIG. 5B, the operation processing module 140 provides another frame signal for the display screen 150 according to the program and the control signal of the motion sensor 130 to conform to the motion status of the controller assembly 120.

Figure 4B:
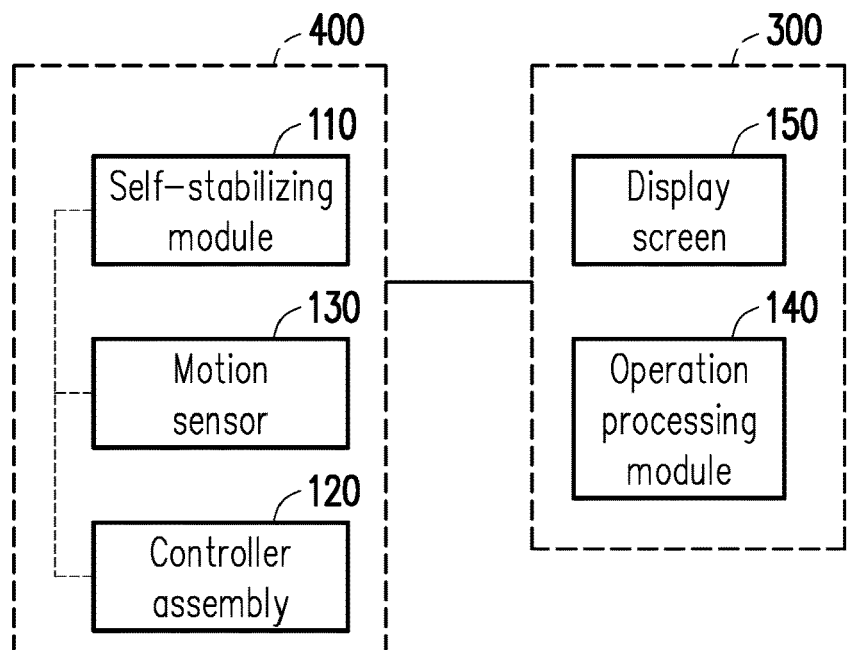
FIG. 4B is a schematic view of a gaming controller and an external electronic device according to the invention.

FIG. 4B is a schematic view of a gaming controller and an external electronic device according to the invention. Referring to FIG. 4B and FIG. 4A, in the foregoing embodiment, the operation processing module 140 of the gaming device 100 and the controller assembly 120 are disposed in the structural member 112b of the second portion 112 of the self-stabilizing module 110 as an integrated structure. In contrast, the present embodiment discloses a gaming controller 400 including the self-stabilizing module 110, the motion sensor 130, and the controller assembly 120. An appearance of the gaming controller 400 is shown in FIG. 2 but the display screen 150 is excluded. Herein, the gaming controller 400 is used for an electrical connection and manipulation with an external electronic device 300 including the display screen 150 and the operation processing module 140. Briefly, the external electronic device 300 includes a variety of mobile electronic devices known in the prior art. That is, the operation processing module 140 and the display screen 150 are disposed in a same structural member and are assembled to the gaming controller 400 via the external electronic device 300 to establish an electrical connection. A user can control the external electronic device 300 via the controller assembly 120 of the gaming controller 400, so that the external electronic device 300 can generate a frame of a corresponding posture on the display screen 150 according to the motion posture of the controller component 120 and the program.

Figure 6A:
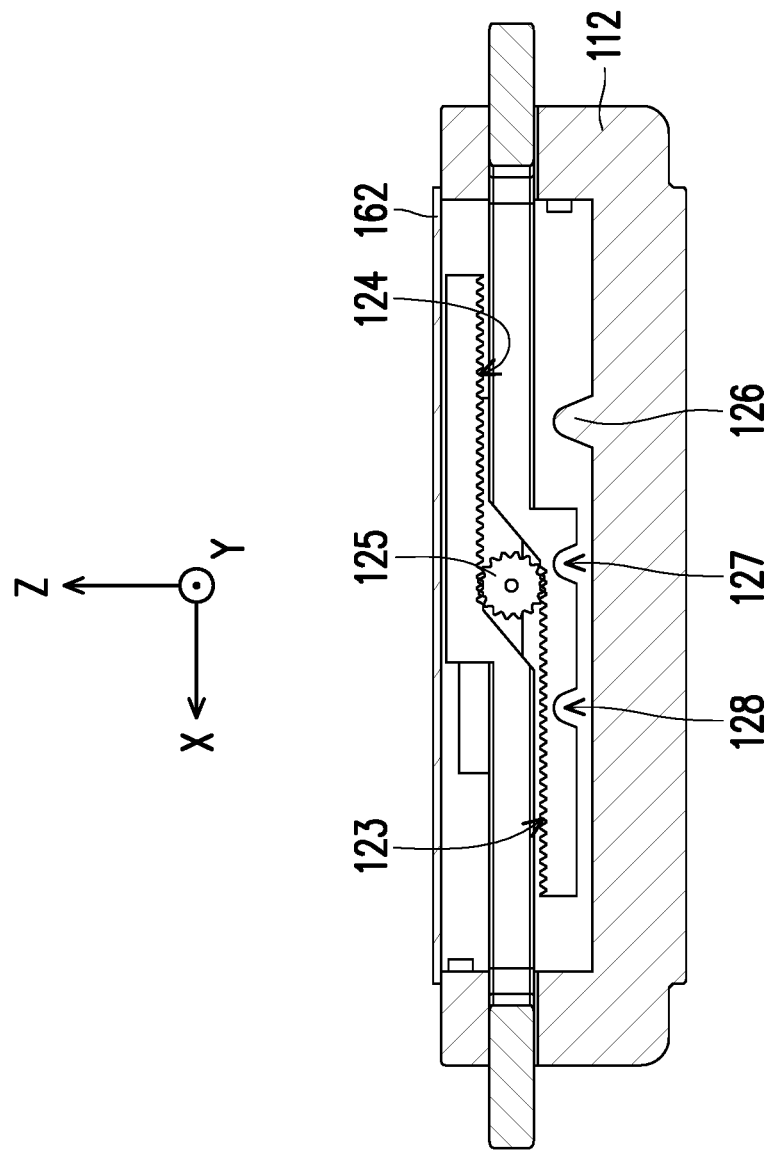
FIG. 6A is a partial cross-sectional view of the gaming device in FIG. 1.
Figure 6B:
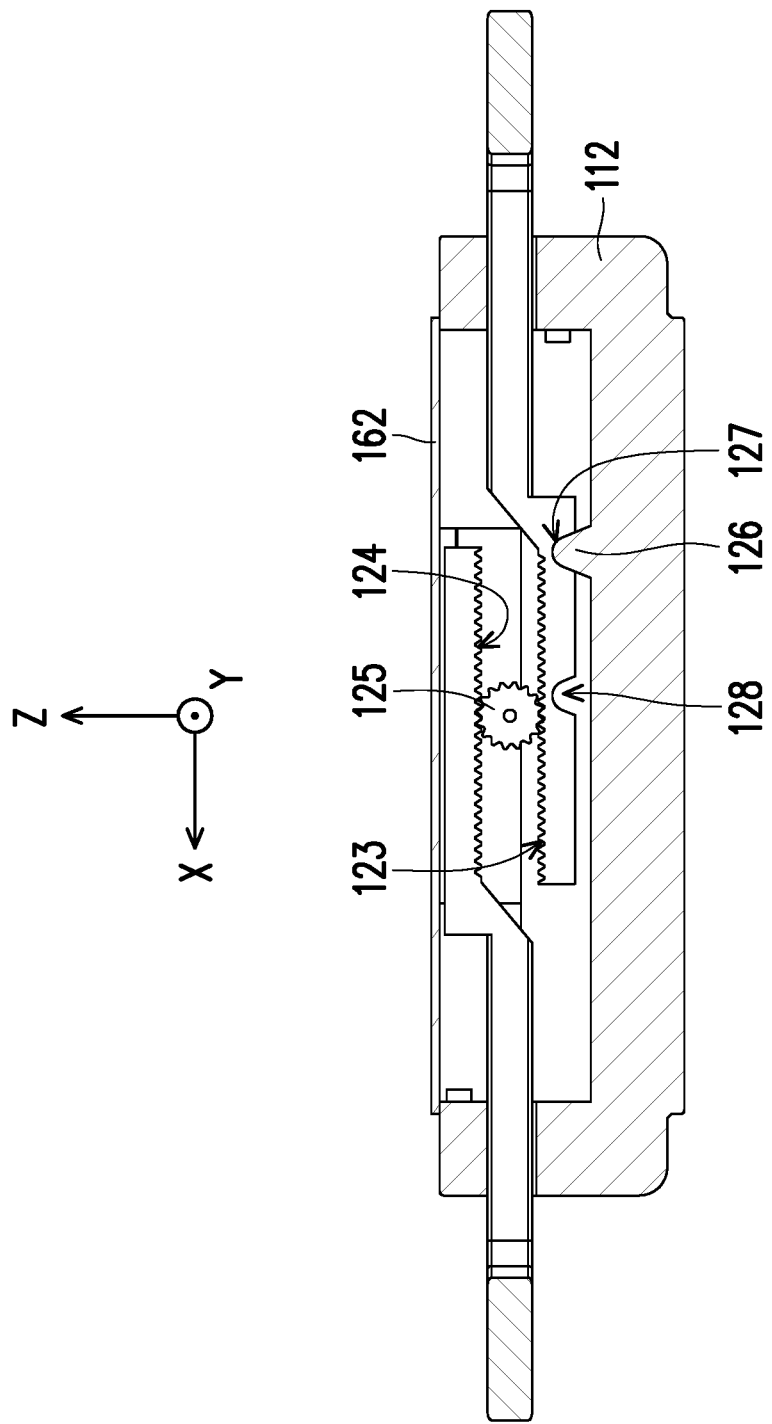
FIG. 6B is a partial cross-sectional view of the gaming device in FIG. 6A in another status.

FIG. 6A is a partial cross-sectional view of the gaming device in FIG. 1. FIG. 6B is a partial cross-sectional view of the gaming device in FIG. 6A in another status. Referring to FIG. 3A, FIG. 6A and FIG. 6B, in the present embodiment, in addition to the handle structure A1 including the controllers 121 and 122, the controller assembly 120 includes a linkage mechanism A2 connected between the controllers 121 and 122 and the second portion 112. The controllers 121 and 122 synchronously move relative to the second portion 112 via the linkage mechanism A2. Further, the linkage mechanism A2 in the present embodiment includes racks 123, 124 and a gear 125. The rack 123 is connected to the controller 121, the rack 124 is connected to the controller 122, and the gear 125 is rotatably disposed along a Y axis in the structural member 160 in which the second portion 112 is located, and is movably coupled between the rack 123 and the rack 124. In this way, when the controller 121 or the controller 122 moves along an X axis, the controller 122 or the controller 121 is driven to move along the X axis via the gear 125 to achieve the foregoing synchronous movement effect.

Figure 6C:
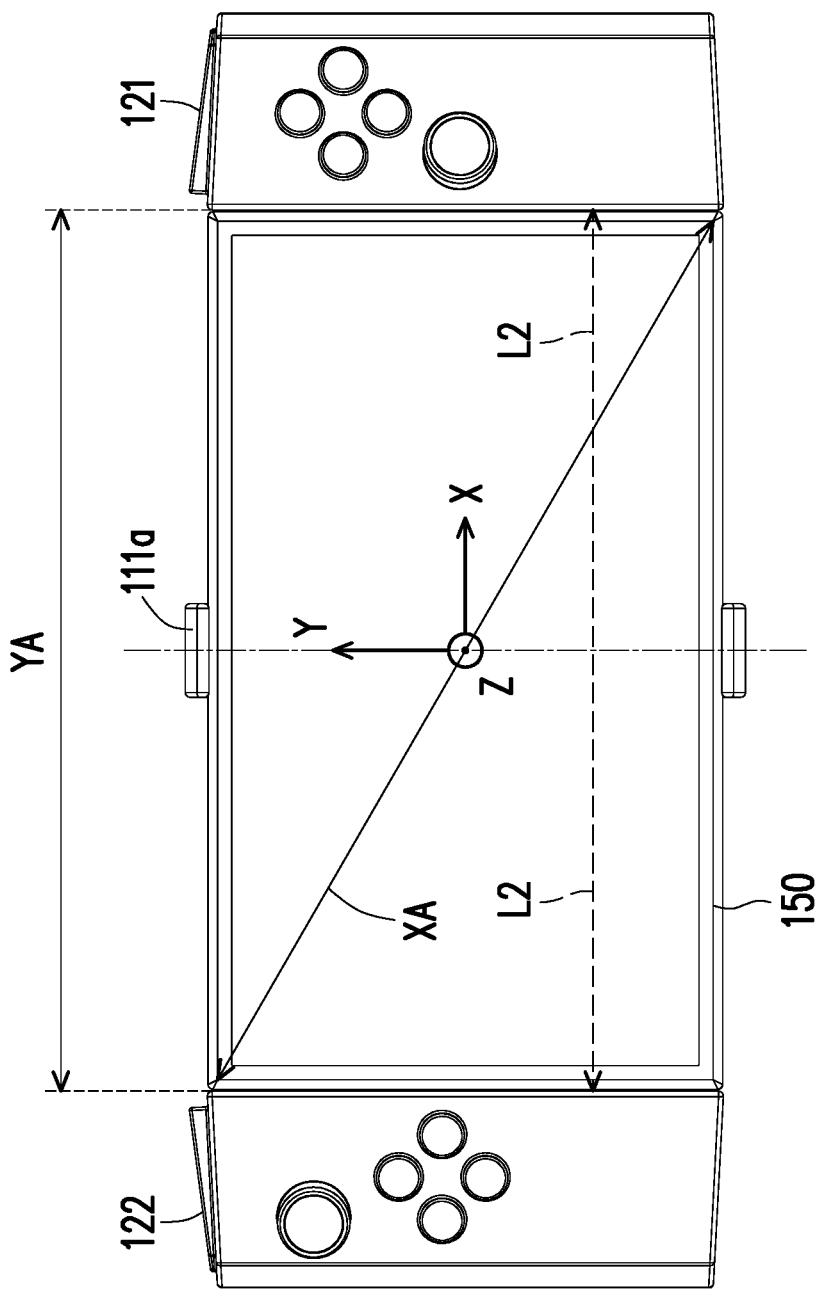
FIG. 6C to FIG. 6F are front views of the gaming device in FIG. 1 in different statuses.
Figure 6D:
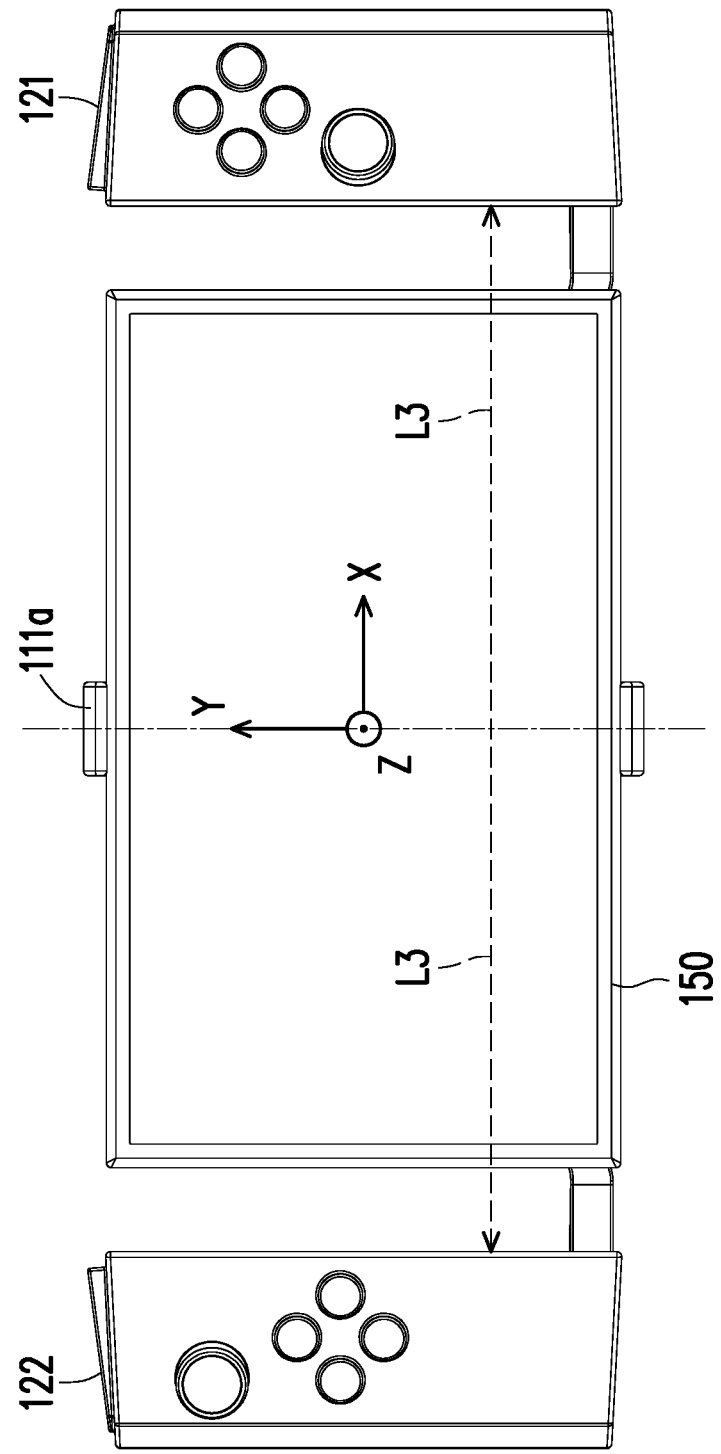

Further, as described below, FIG. 6C to FIG. 6F are front views of the gaming device in FIG. 1 in different statuses. FIG. 6C substantially corresponds to the status in FIG. 6A, and FIG. 6D substantially corresponds to the status in FIG. 6B. First, referring to FIG. 6A and FIG. 6C, in the present embodiment, the controllers 121 and 122 are substantially in contact with two opposite sides of the display screen 150 and are located at a second location, that is, the controller 121 or 122 is symmetrical relative to the center C1 (Z axis) of the display screen 150, and a same distance L2 relative to the center C1 is defined. The linkage mechanism A2 further includes a positioning member 126 disposed in the structural member 112b accommodating the second portion 112 (as shown in FIG. 3A, the second portion 112 is merely marked as an example), and the rack 123 includes a plurality of positioning portions 127, 128, the positioning member 126 being located on a moving path of the positioning portions 127, 128. Then, as shown in FIG. 6B and FIG. 6D, when the controllers 121 and 122 are pulled to a third location relative to the second portion 112, that is, a same distance L3 between the controller 121 or 122 and the enter C1 (Z-axis) of the display screen 150 is defined, the positioning member 126 is temporarily engaged with one of the positioning portions 127, 128 for positioning. Herein, in any of the statuses in FIG. 6C to FIG. 6E, distances of the controllers 121 and 122 relative to the second portion 112 are equal, and a distance L1>the distance L3>the distance L2.

In addition, when the controller assembly 120 is stretched to a first location relative to the display screen 150 and the self-stabilizing module 110, that is, a same distance L3 between the controller 121 or 122 and the enter C1 (Z-axis) of the display screen 150 is defined, the positioning member 126 is engaged with the positioning portion 128. Corresponding quantities of the positioning member 126 and the positioning portions 127, 128 are not limited herein, and may be correspondingly adjusted according to a control mode required by the controller assembly 120.

Certainly, in another non-illustrated embodiment, the linkage mechanism may be adjusted based on a stroke (for example, a transmission gear set is disposed and a reduction ratio of the transmission gear set is adjusted accordingly), and a movement stroke of the controller 121 or 122 is appropriately adjusted to allow the controllers 121 and 122 to move synchronously, the controllers 121 and 122 having different movement strokes. In other words, as shown in any of FIG. 6C to FIG. 6E, when the controllers 121 and 122 have different strokes, distances of the controllers 121 and 122 relative to the second portion 112 are not equal.

It should be noted that in the present embodiment, the self-stabilizing module 110 can be activated when the controller assembly 120 is stretched along the X axis relative to the self-stabilizing module 110 or the display screen 150. For example, a switching element is disposed at a specific location in the linkage structure A2, so that the self-stabilizing module 110 can be activated or shut down when the linkage structure A2 moves to the specific location. Only one status is described below, but a timing at which the stretching process of the controller assembly 120 causes the self-stabilizing module 110 to be activated is not limited. Taking FIG. 6C to FIG. 6E as an example, in another embodiment, the self-stabilizing module 110 may be activated in the status shown in FIG. 6D, and is shut off again in the status shown in FIG. 6E. In other words, different from the foregoing embodiment, stretching the controller 121 and 122 to a farthest location relative to the second portion 112 is used as a timing for starting the self-stabilizing module 110. In other embodiments, a designer may appropriately change the timing according to a use requirement of the gaming device or the gaming controller, so that a distance between the controller 121 or 122 and the second portion 112 when the self-stabilizing module 110 is activated is less than a distance between the controller 121 or 122 and the second portion 112 when the self-stabilizing module 110 is not activated.

Figure 6E:
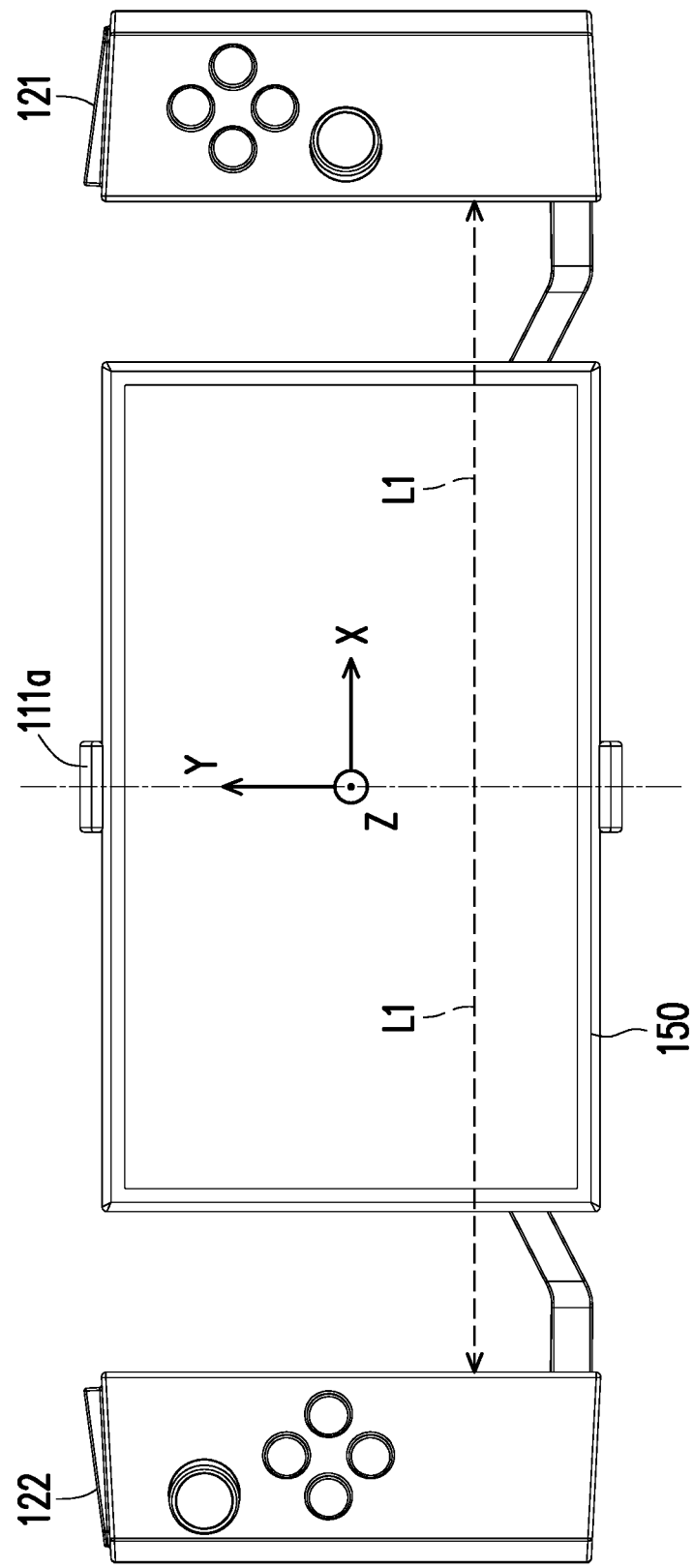

Referring to FIG. 6C to FIG. 6F, it is specified herein that the self-stabilizing module 110 in the present embodiment is activated when the controller assembly 120 moves to the first location relative to the second portion 112 of the self-stabilizing module 110. As shown in FIG. 6E, distances of the controllers 121 and 122 relative to the second portion 112 are equal, that is, the above-described distance L1.

Figure 6F:
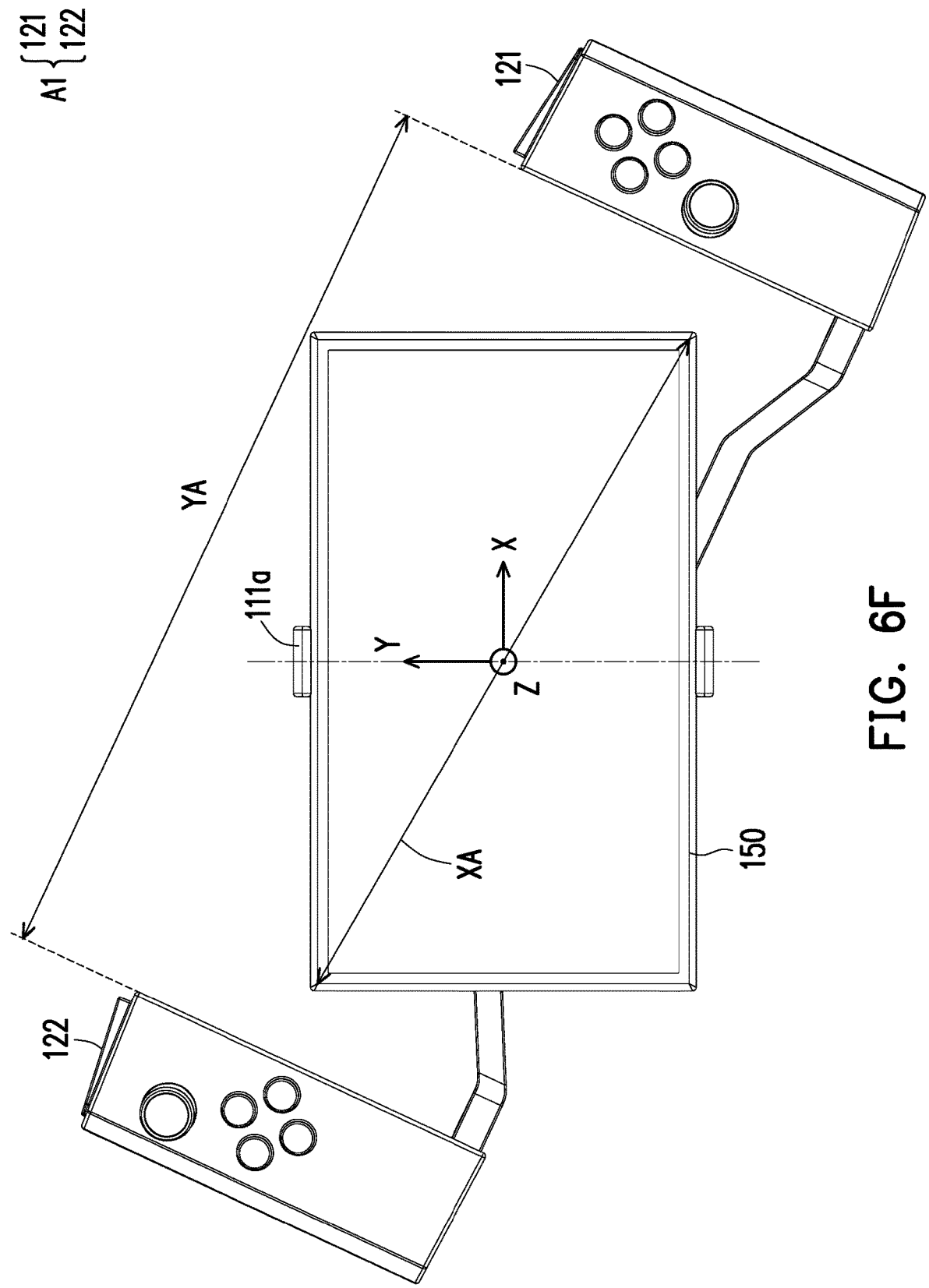

As described above, the first portion 111 and the second portion 112 can be rotated relative to each other after the self-stabilizing module 110 is activated. As shown in FIG. 6F, because the controller assembly 120 and the display screen 150 are substantially located in a same plane (an X-Y plane), in order to make the controller assembly 120 smoothly rotate as shown in FIG. 6F, a variable relative distance YA between the controller 121 and the controller 122 synchronized with each other and a diagonal dimension XA of the display screen 150 are further defined herein, where XA<YA≤15XA. Therefore, a range of motion of the controller assembly 120 relative to the display screen 150 is limited, and the display screen 150 is not located on a movement track of the controller assembly 120, thereby avoiding a possibility of member interference.

In another non-illustrated embodiment, the controller assembly 120 of the gaming device 100 may be located at only the third location and the first location in the foregoing embodiment, so that a user only needs to directly pull the controller assembly 120 relative to the second portion 112 to directly start the self-stabilizing module 110 during operation.

Figure 6G:
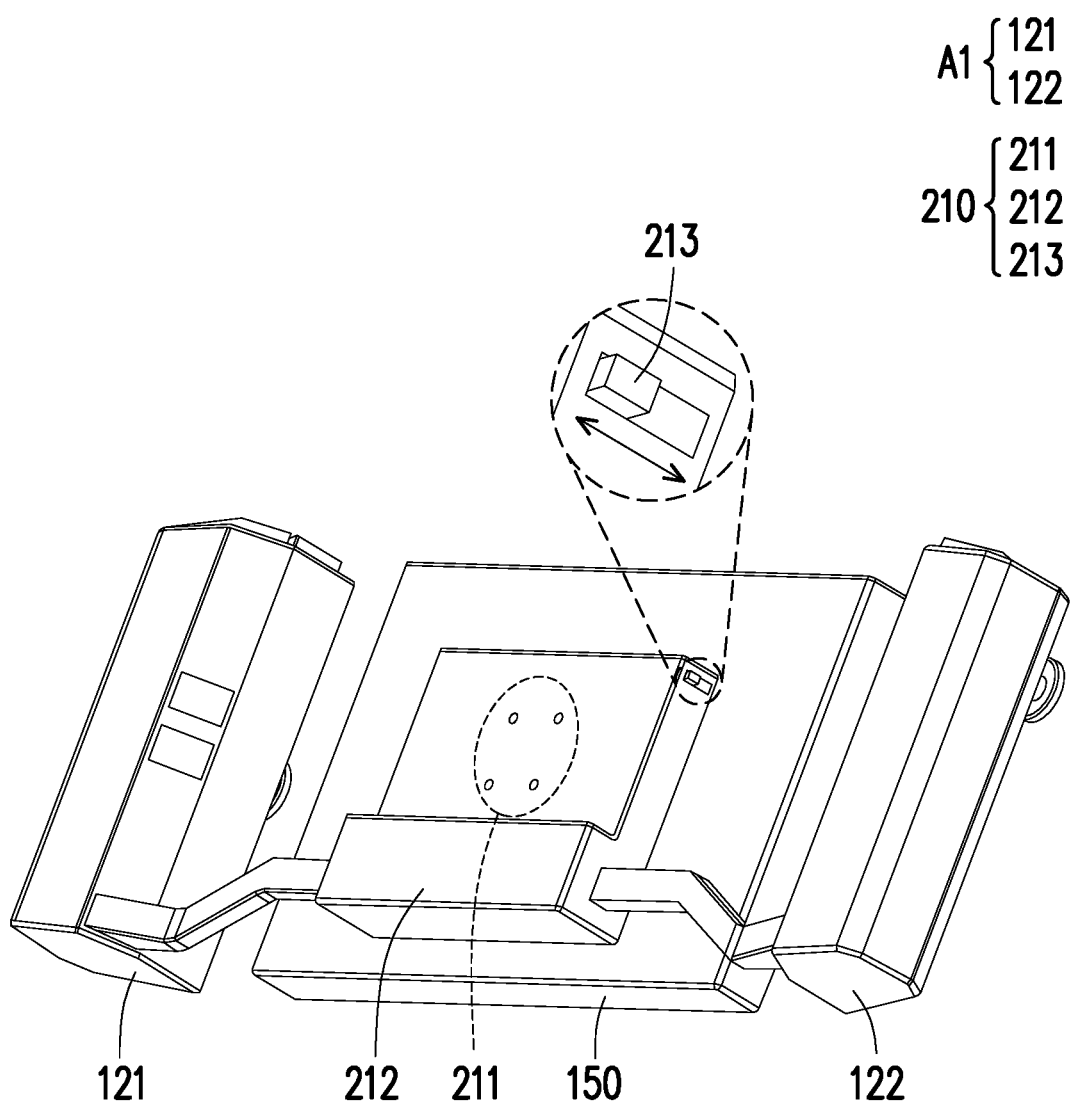
FIG. 6G is a schematic view of a gaming device according to another embodiment of the invention.

FIG. 6G is a schematic view of a gaming device according to another embodiment of the invention. Referring to FIG. 6G, a self-stabilizing module 210 in the present embodiment includes a first portion 211, a second portion 212, and a switch 213, the first portion 211 and the second portion 212 being the same as those in the foregoing embodiment. Different from the foregoing embodiment, the self-stabilizing module 210 in the present embodiment is manually activated, and is not affected by whether the controllers 121 and 122 are in a stretched status relative to the display screen 150. That is, the self-stabilizing module 210 in the present embodiment forms a switch 213 of a physical structure at the second portion 212. In other words, whether the self-stabilizing module 210 in the present embodiment is activated depends on whether a user pulls the switch 213. Certainly, in a non-illustrated embodiment, the operation processing module 140 may provide a frame signal to the display screen 150 according to a program requirement, so as to form a virtual switch with an enabling function and a disabling function on the display screen 150, so that the user chooses whether to start the self-stabilizing module 210.

Figure 7A:
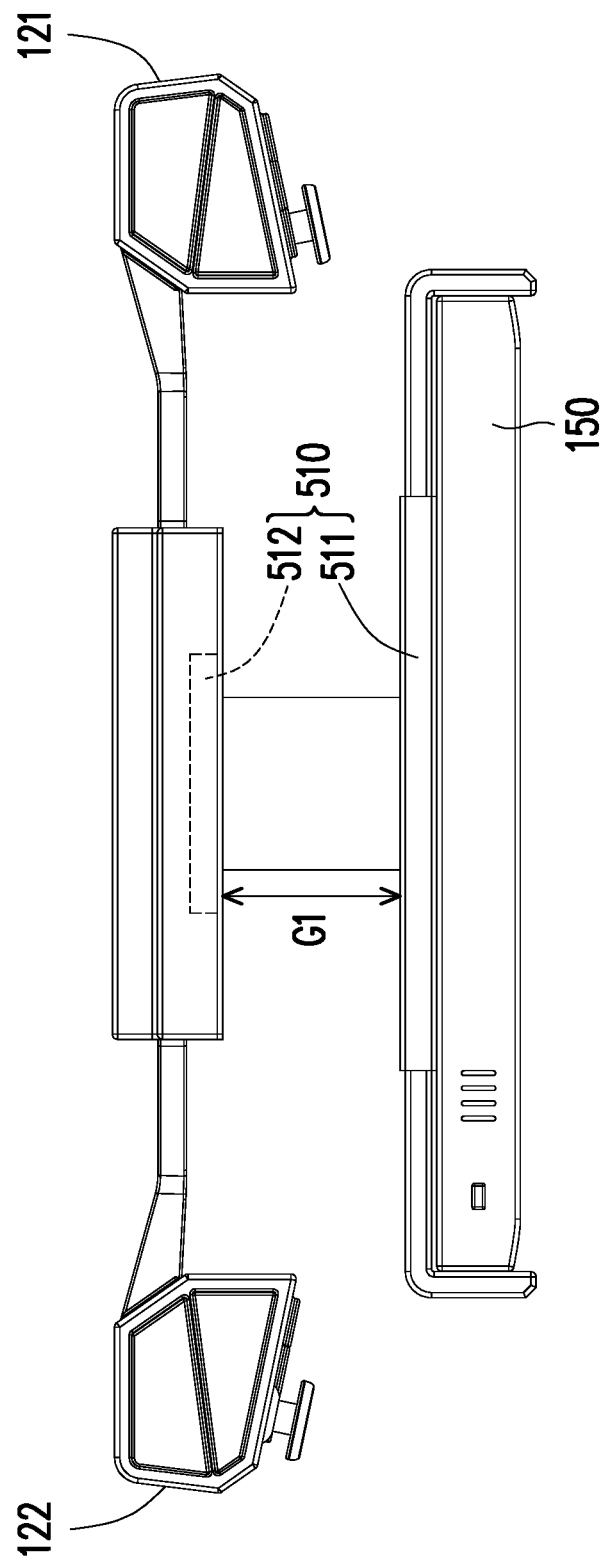
FIG. 7A is a schematic view of a gaming device according to another embodiment of the invention.
Figure 7B:
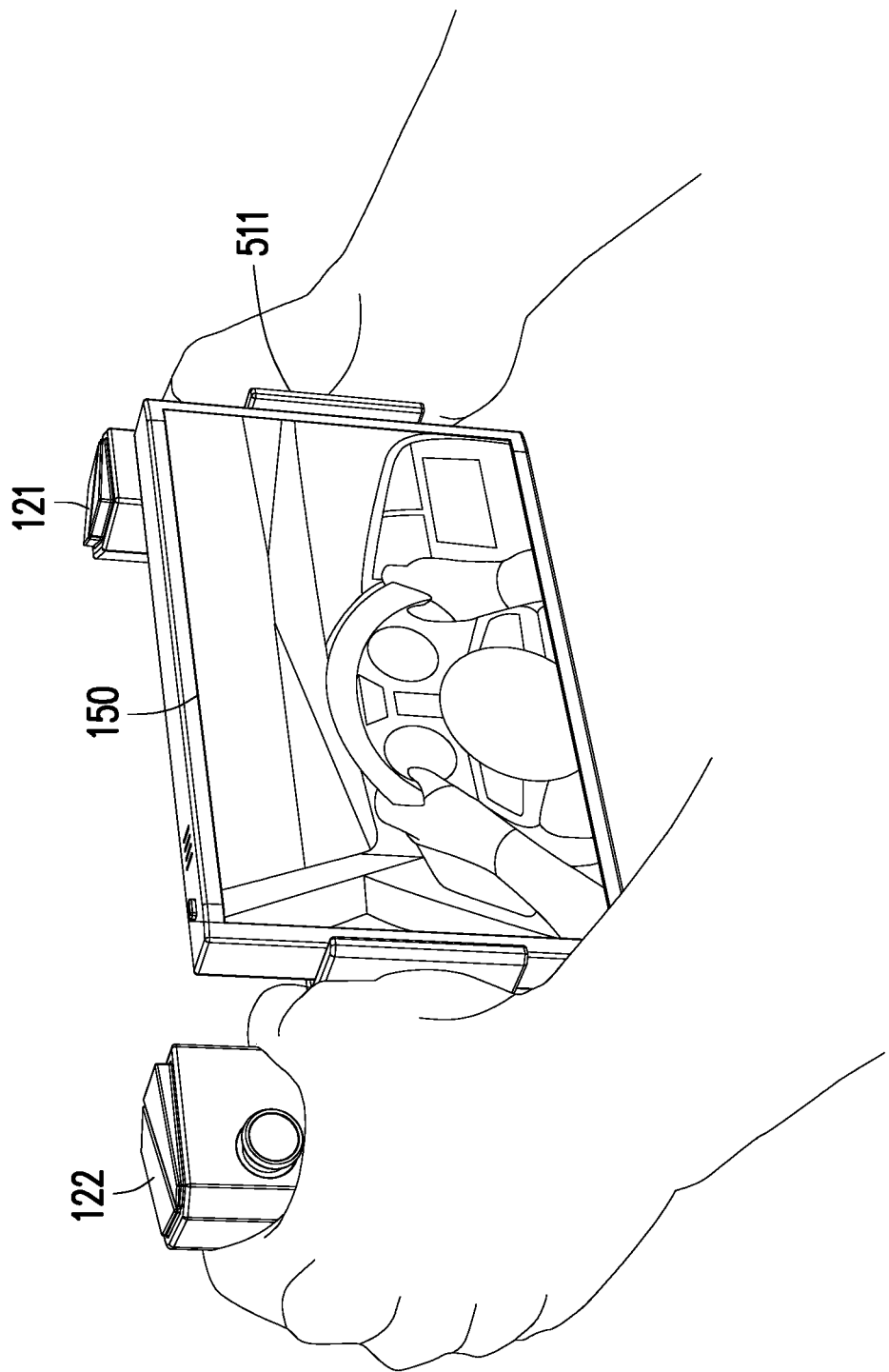
FIG. 7B and FIG. 7C are schematic operation views of the gaming device in FIG. 7A.
Figure 7C:
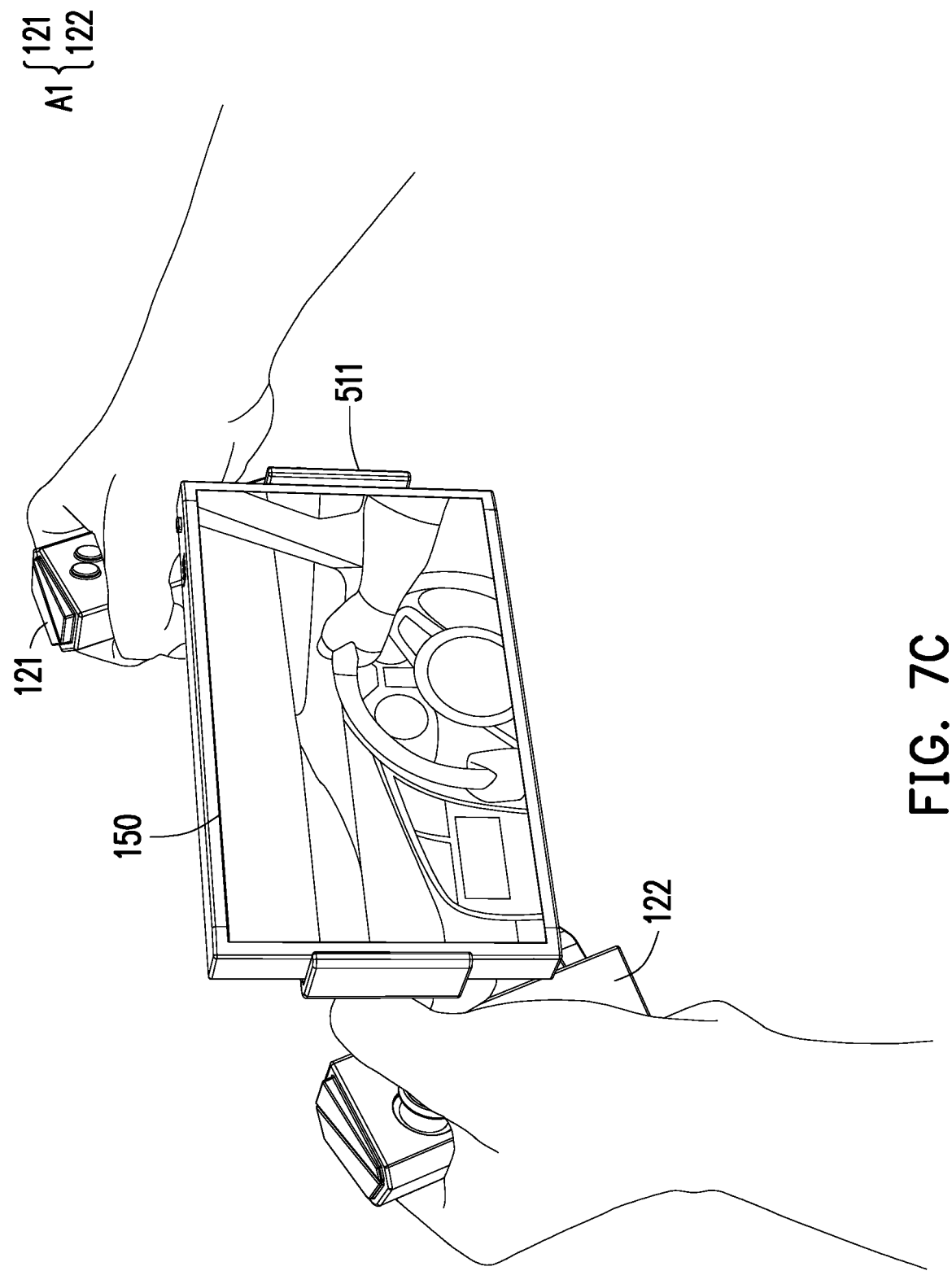

It can be clearly learned from FIG. 6C to FIG. 6F, at the second location shown in FIG. 6C and the third location shown in FIG. 6D, because the distance L2 and the distance L3 cannot satisfy a relationship between the relative distance YA and the diagonal dimension XA, there may be member interference, and thus the self-stabilizing module 110 is not activated at the shown location. However, the invention is not limited thereto. FIG. 7A is a schematic view of a gaming device according to another embodiment of the invention. FIG. 7B and FIG. 7C are schematic operation views of the gaming device in FIG. 7A. Referring to FIG. 7A to FIG. 7C, different from the foregoing embodiment, there is a spacing G1 between the first portion 511 and the second portion 512 in the self-stabilizing module 510 in the present embodiment. That is, the second portion 512 and the controllers 121 and 122 are located in a same plane, and the display screen 150 disposed at the first portion 511 and the first portion 111 are in another plane. In other words, movement tracks of the display screen 150 and the controller assembly (the controllers 121 and 122) are located in different planes parallel to each other. In this way, a user does not need to pull the controllers 121 and 122 away from the display screen 150 to start the self-stabilizing module 510 when operating the gaming device or the controller assembly. As shown in FIG. 7B and FIG. 7C, after the user holds the handle structure A1, the user can independently choose whether to start the self-stabilizing module to perform a corresponding operation. Herein, a means for starting the self-stabilizing module 510 may be the same as that in the embodiment shown in FIG. 6G.

Figure 8A:
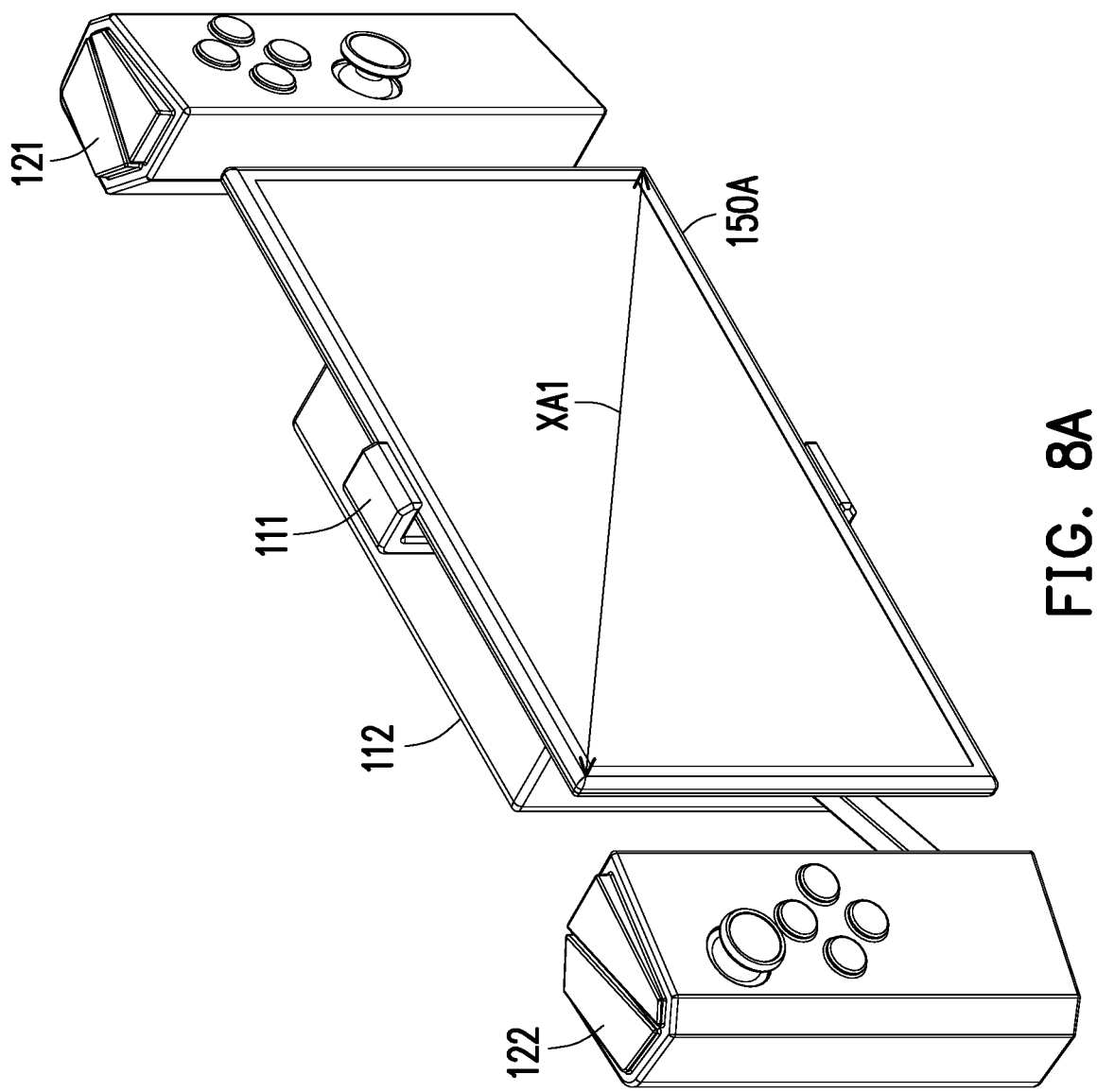
FIG. 8A and FIG. 8B are schematic views of applications of different display screens.
Figure 8B:
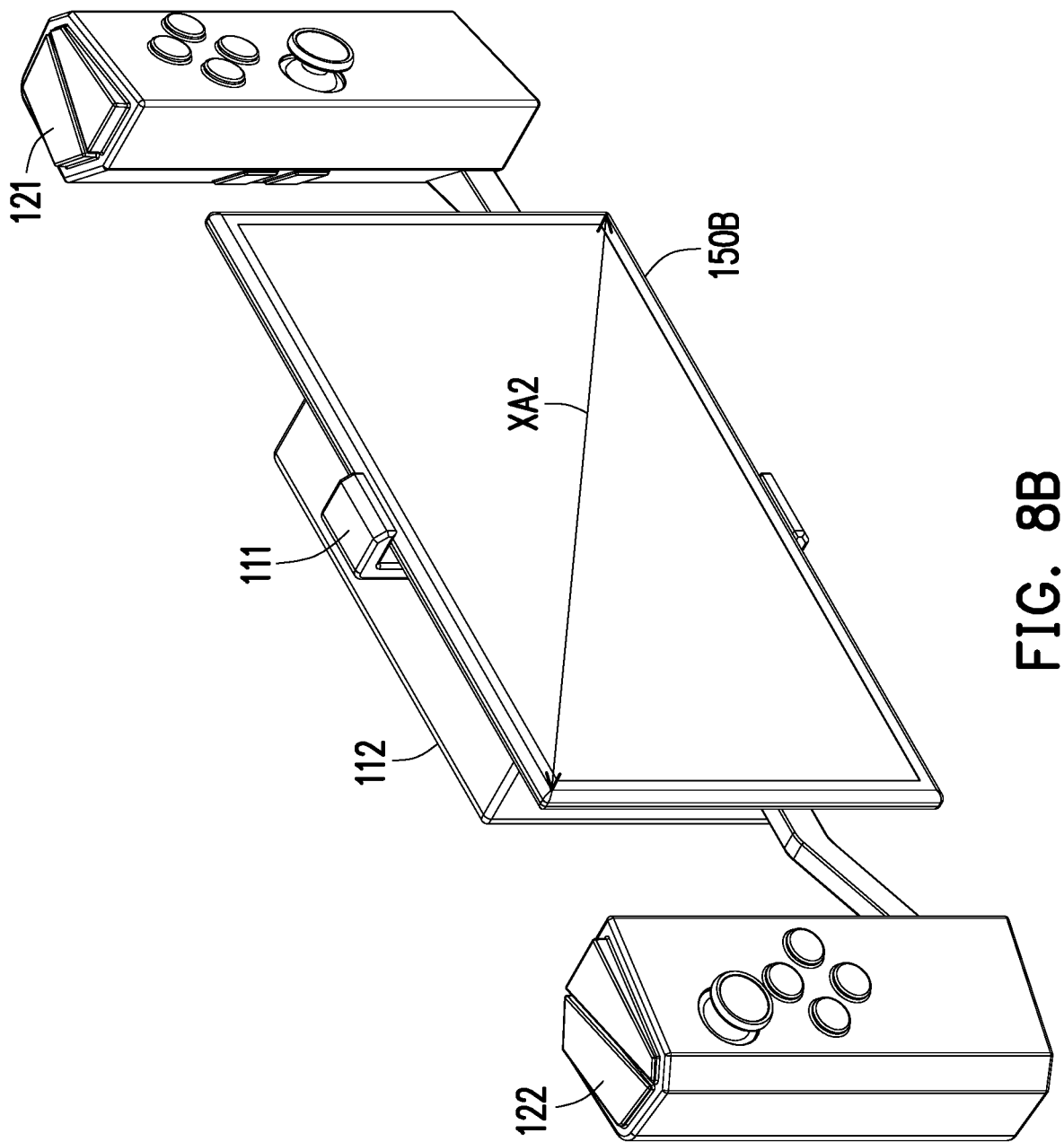

FIG. 8A and FIG. 8B are schematic views of applications of different display screens. Referring to FIG. 8A and FIG. 8B, it may be considered that the foregoing gaming device is configured with different sizes of display screens, or it may be considered that the foregoing gaming controller can be cooperated with an external electronic device including different sizes of display screens. Referring to FIG. 8A and FIG. 8B, operation modes of the controller assembly and the display screen can be effectively executed in either case. In FIG. 8A, a diagonal size XA1 of a display screen 150A is smaller than a spacing of the controllers 121 and 122. In FIG. 8B, a diagonal size XA2 of a display screen 150B is smaller than the spacing of the controllers 121 and 122.

Figure 9A:
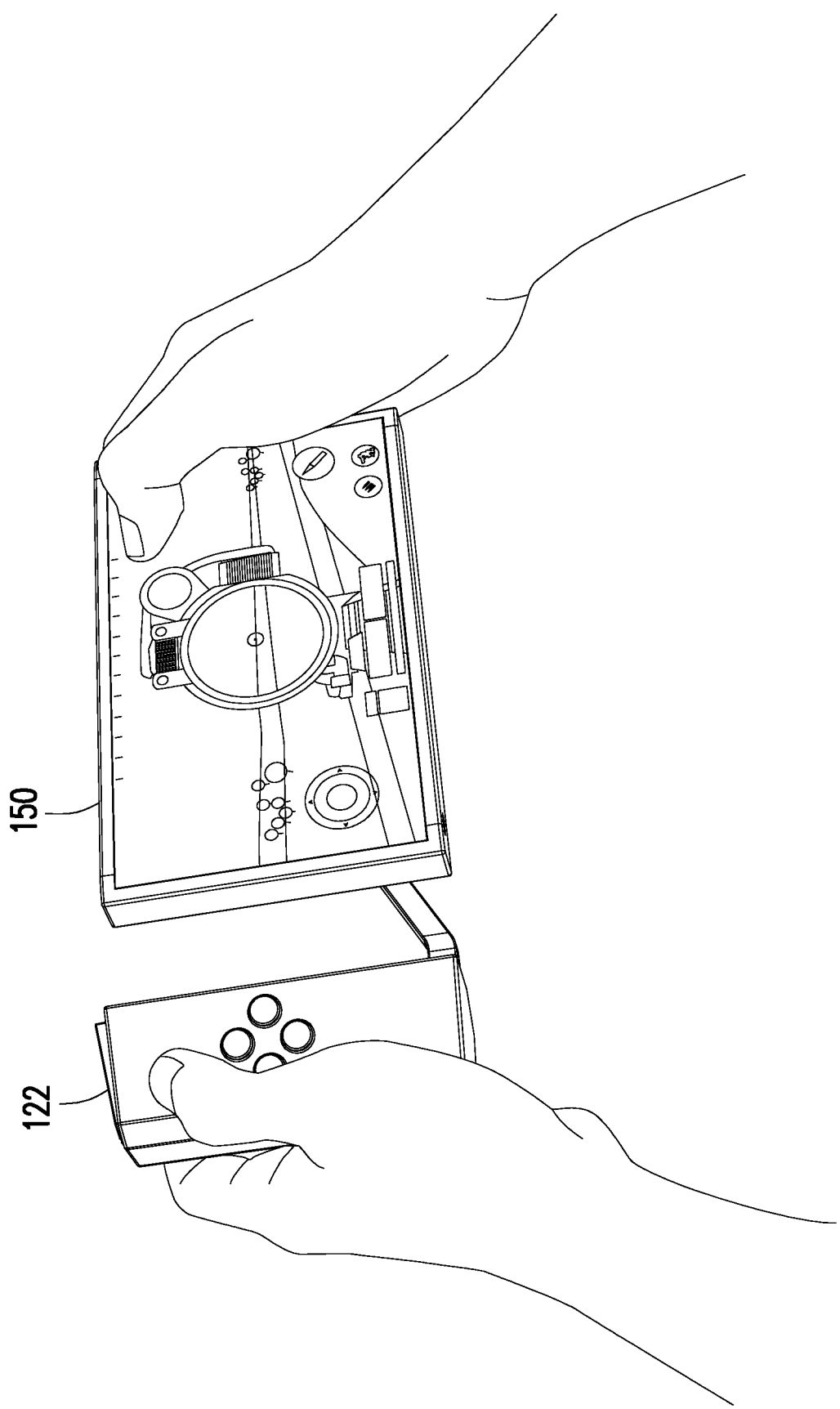
FIG. 9A and FIG. 9B are schematic views of a controller assembly according to another embodiment of the invention.
Figure 9B:
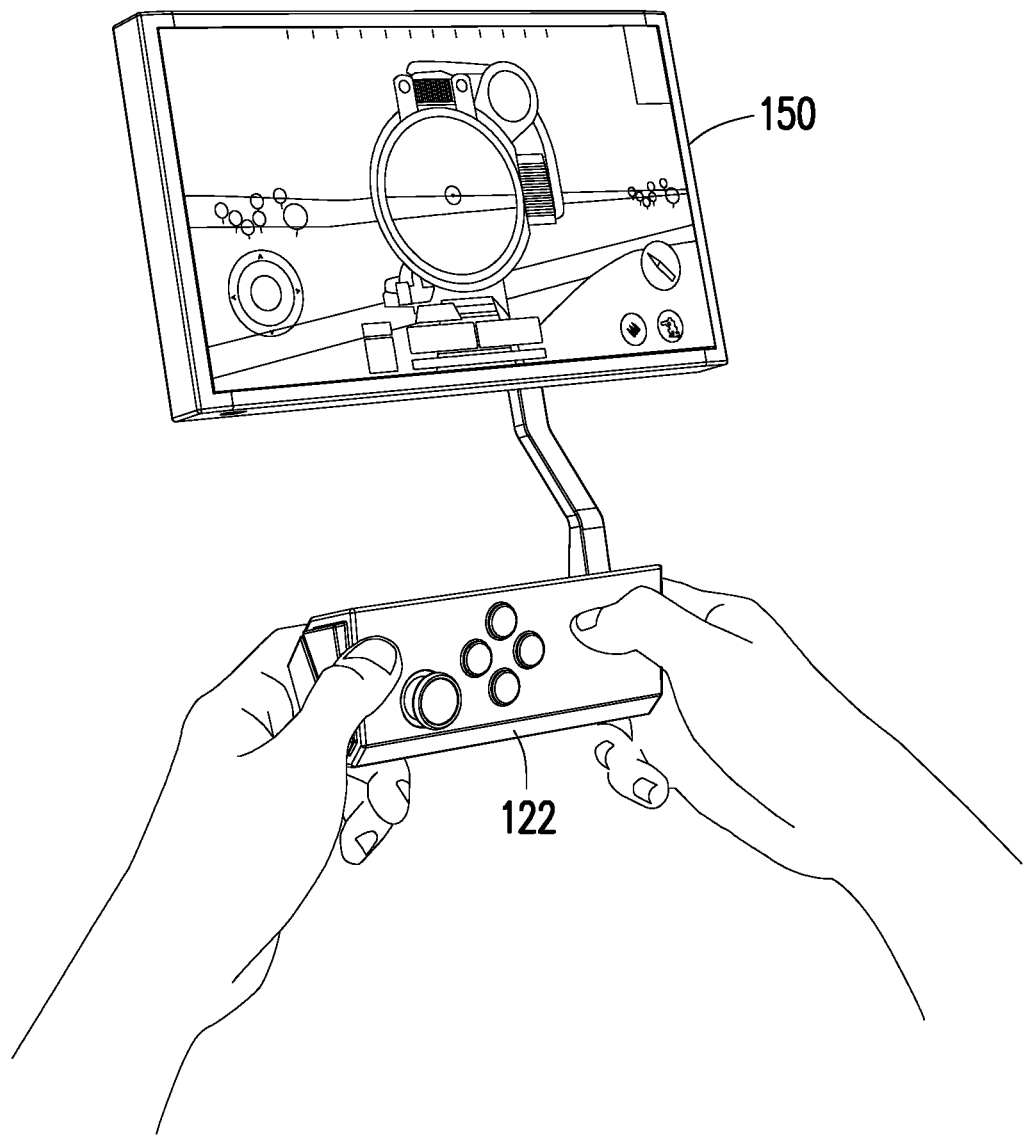

FIG. 9A and FIG. 9B are schematic views of a controller assembly according to another embodiment of the invention. Referring to FIG. 9A and FIG. 9B, as mentioned above, the controller assembly may also be regarded as a gaming device in another embodiment. Different from the foregoing symmetrically disposed controllers 121 and 122, the controller assembly in the present embodiment has only a single controller 122, and the remaining members such as a self-stabilizing module, a motion sensor, an operation processing module, and a display screen are the same as those described above. Herein, as shown in FIG. 9A, the display screen may be a touch screen, so that a sense of control can be provided for a user. Furthermore, as shown in FIG. 9B, the controller assembly in the present embodiment can also achieve the rotation effect as described above.

In summary, in the foregoing embodiments of the invention, the gaming device or the gaming controller is cooperated with the controller assembly, the motion sensor, and the operation processing module via the self-stabilizing module, so that after the self-stabilizing module is activated, the relative rotational motion generated by the first portion and the second portion can be sensed by the motion sensor to generate the control signal. Further, the operation processing module receives the control signal to generate the frame signal to the display screen, so that the frame signal can reflect a current operation posture of the controller assembly relative to the display screen in real time. Further, on the premise that the self-stabilizing module serves a necessary member of the controller assembly to provide a real-time control effect for the user, the designer can design the gaming device or the gaming controller correspondingly according to a use requirement. The gaming device provides a complete game console, a program, and an accessory, and the gaming controller is considered as a gaming accessory that can be cooperated with an existing mobile device. Both the gaming device and the gaming controller can provide real-time gaming experience for the user, that is, the user can feel a sense of presence when playing a game via a real-time operation of the controller assembly and a real-time reaction to the display screen.

Although the invention is described with reference to the above embodiments, the embodiments are not intended to limit the invention. A person of ordinary skill in the art may make variations and modifications without departing from the spirit and scope of the invention. Therefore, the protection scope of the invention should be subject to the appended claims.

What is claimed is:

1. A gaming device, comprising:
a stabilizer comprising a first portion and a second portion;
a controller assembly assembled to the second portion;
a motion sensor;
an processor; and
a display screen assembled to the first portion, wherein the processor generates a frame signal to the display screen according to a program;
wherein the motion sensor generates a control signal due to relative rotation of the first portion and the second portion when the stabilizer is activated and the controller assembly and the second portion rotate about a self-stabilizing axis relative to the first portion, the processor generates another frame signal to the display screen according to the control signal and the program, and the another frame signal corresponds to a movement posture of the controller assembly relative to the display screen; and the display screen is not located on a movement track of the controller assembly when the controller assembly rotates about the self-stabilizing axis relative to the first portion.

2. The gaming device according to claim 1, wherein a normal line of the display screen is parallel to the self-stabilizing axis.

3. The gaming device according to claim 1, wherein a normal line of the display screen is coaxial with the self-stabilizing axis.

4. The gaming device according to claim 1, wherein a normal line of the display screen is at an angle with the self-stabilizing axis, and the angle ranges from −90 degrees to +90 degrees.

5. The gaming device according to claim 1, wherein a center of the display screen is located on the self-stabilizing axis.

6. The gaming device according to claim 1, wherein a movement track of the display screen and the movement track of the controller assembly are located in a same plane.

7. The gaming device according to claim 1, wherein a movement track of the display screen and the movement track of the controller assembly are located in different planes parallel to each other.

8. The gaming device according to claim 1, wherein the stabilizer is activated when the controller assembly moves to a first location relative to the second portion.

9. The gaming device according to claim 8, wherein the controller assembly comprises a pair of controllers, and distances of the pair of controllers relative to the second portion are not equal when the controller assembly is at the first location.

10. The gaming device according to claim 8, wherein the controller assembly comprises a pair of controllers, and distances of the pair of controllers relative to the second portion are equal when the controller assembly is at the first location.

11. The gaming device according to claim 8, wherein the controller assembly comprises a pair of controllers and a linkage mechanism, the linkage mechanism is connected between the pair of controllers and the second portion, and the pair of controllers synchronously move relative to the second portion via the linkage mechanism.

12. The gaming device according to claim 8, wherein the controller assembly comprises a pair of controllers, the display screen is located between the pair of controllers, a size of the display screen is X, and a relative distance between the pair of controllers at the first location is Y, and $X<Y\leq15X$.

13. The gaming device according to claim 8, wherein the controller assembly comprises at least one controller and a linkage mechanism, the linkage mechanism is connected between the controller and the second portion, the controller is movable relative to the second portion via the linkage mechanism, and the stabilizer is shut down and the controller is adjacent to the display screen when the controller moves to a second location relative to the second portion.

14. The gaming device according to claim 13, wherein the controller is away from the display screen and the stabilizer is not activated when the controller moves to a third location relative to the second portion.

15. The gaming device according to claim 14, wherein a distance between the controller at the third location and the display screen is less than a distance between the controller at the first location and the display screen.

16. The gaming device according to claim 14, wherein a distance between the controller at the third location and the display screen is greater than a distance between the controller at the first location and the display screen.

17. The gaming device according to claim 13, wherein the linkage mechanism comprises a gear and at least one rack, the controller is connected to the at least one rack, the gear is rotatably disposed at the second portion, and the at least one rack is movably coupled to the gear.

18. The gaming device according to claim 17, wherein the linkage mechanism further comprises a positioning member disposed at the second portion, the at least one rack comprises a plurality of positioning portions, the positioning member is located on a moving path of the positioning portions, and the positioning member is temporarily engaged with one of the positioning portions for positioning when the controller is at the first location or the third location.

19. The gaming device according to claim 13, wherein the controller assembly comprises a pair of controllers, the linkage mechanism comprises a gear and a pair of racks, the gear is rotatably disposed at the second portion, the pair of controllers are connected to the pair of racks respectively, and the pair of racks are movably coupled to the gear respectively.

20. The gaming device according to claim 1, wherein the processor and the display screen are disposed in a same structural member.

21. The gaming device according to claim 1, wherein the processor and the stabilizer are disposed in a same structural member.

22. The gaming device according to claim 1, wherein the motion sensor is an optical tracking sensor disposed at the first portion or the second portion to detect a relative rotation angle between the first portion and the second portion.

23. The gaming device according to claim 1, wherein the motion sensor is a gyroscope disposed at the first portion or the second portion to detect a relative rotation angle between the first portion and the second portion.

24. The gaming device according to claim 1, wherein the controller assembly comprises at least one controller, the at least one controller is adapted to move about the self-stabilizing axis relative to the display screen when the stabilizer is activated.

25. The gaming device according to claim 24, wherein the stabilizer is activated or shut down according to a corresponding status of the controller relative to the second portion.

26. The gaming device according to claim 1, wherein the stabilizer is activated or shut down under control of at least one of the controller assembly, the processor, and the display screen.

27. A gaming controller configured to contact an external electronic device to operate a game, the gaming controller comprising:
a stabilizer comprising a first portion and a second portion, the external electronic device being adapted to be assembled to the first portion;
a motion sensor; and
a controller assembly disposed at the second portion, wherein the controller assembly and the second portion rotate about at least one self-stabilizing axis relative to the first portion when the stabilizer is activated, the external electronic device is not located on a movement track of the controller assembly, and the motion sensor generates a control signal due to the relative rotation of the first portion and the second portion and transmits the control signal to the external electronic device.

28. The gaming controller according to claim 27, wherein the external electronic device is a display screen, the gaming controller comprises an processor, the display screen is assembled to or detached from the first portion, the display screen assembled to the first portion is electrically connected to the stabilizer, the controller assembly, and the processor, the processor generates a frame signal to the display screen according to a program, and the processor generates another frame signal to the display screen according to the control signal and the program, and the another frame signal corresponds to a movement posture of the gaming controller relative to the display screen.

29. The gaming controller according to claim 27, wherein the external electronic device comprises a display screen and an processor, the display screen, the processor, the stabilizer, and the controller assembly are electrically connected when the external electronic device is assembled to the first portion, the processor generates a frame signal to the display screen according to a program, the processor generates another frame signal to the display screen according to the control signal and the program, and the another frame signal corresponds to a movement posture of the gaming controller relative to the display screen.

30. The gaming controller according to claim 27, wherein the controller assembly comprises at least one controller, and the controller is adapted to move about the at least one self-stabilizing axis relative to the external electronic device when the stabilizer is activated.

31. The gaming controller according to claim 30, wherein the stabilizer is activated or shut down according to a corresponding status of the controller relative to the second portion.

32. The gaming controller according to claim 27, wherein the stabilizer is activated or shut down under control of at least one of the controller assembly and the external electronic device.

33. The gaming controller according to claim 27, wherein the controller assembly comprises at least one controller and a linkage mechanism, the linkage mechanism is connected between the controller and the second portion, and the controller moves to a plurality of different locations relative to the second portion via the linkage mechanism.

34. The gaming controller according to claim 27, wherein the motion sensor is an optical tracking sensor disposed at the first portion or the second portion to detect a relative rotation angle between the first portion and the second portion.

35. The gaming controller according to claim 27, wherein the motion sensor is a gyroscope disposed at the first portion or the second portion to detect a relative rotation angle between the first portion and the second portion.

* * * * *